(12) United States Patent
Limberg

(10) Patent No.: US 6,816,204 B2
(45) Date of Patent: Nov. 9, 2004

(54) GHOST CANCELLATION REFERENCE SIGNALS FOR BROADCAST DIGITAL TELEVISION SIGNAL RECEIVERS AND RECEIVERS FOR UTILIZING THEM

(76) Inventor: Allen Le Roy Limberg, 2500 Lakevale Dr., Vienna, VA (US) 22181-4028

( * ) Notice: Subject to any disclaimer, the term of this patent is extended or adjusted under 35 U.S.C. 154(b) by 532 days.

(21) Appl. No.: 09/765,019

(22) Filed: Jan. 18, 2001

(65) Prior Publication Data

US 2001/0033341 A1 Oct. 25, 2001

Related U.S. Application Data

(60) Provisional application No. 60/177,080, filed on Jan. 19, 2000.

(51) Int. Cl.[7] .......................... H04N 5/21; H04N 5/213; H04N 5/217
(52) U.S. Cl. ....................... 348/614; 348/611; 375/231; 375/233
(58) Field of Search ................................ 348/614, 611; 375/262, 265, 341, 229, 230, 231, 232–239, 350; H04N 5/21, 5/213, 5/217

(56) References Cited

U.S. PATENT DOCUMENTS

RE31,253 E * 5/1983 Weinstein ................ 179/170.2
5,065,242 A * 11/1991 Dieterich et al. ............ 348/614
5,251,033 A * 10/1993 Anderson et al. ............ 348/607
5,592,235 A * 1/1997 Park et al. .................... 348/555
5,886,748 A * 3/1999 Lee .............................. 348/614
5,955,618 A * 9/1999 Kim ............................. 348/526
6,229,560 B1 * 5/2001 Jun ................................ 348/21
6,515,713 B1 * 2/2003 Nam ........................... 348/614
6,559,894 B2 * 5/2003 Omura et al. ................ 348/614

* cited by examiner

Primary Examiner—Michael H. Lee
Assistant Examiner—Trang U. Tran

(57) ABSTRACT

Broadcast DTV signals are improved by including in each of their successive data fields a training signal for the adaptive channel-equalization and echo-cancellation filtering in receivers. The training signal in each data field includes a prescribed number of cycles of a particular pseudo-random noise sequence extending over a plurality of data segments to provide a training signal for the adaptive filtering that is of longer duration than one of said data segments. Each data segment in each data field begins with a data segment synchronizing sequence, and the training signals incorporate some of these data segment synchronizing sequences within themselves. Receivers are described that initialize the parameters of the adaptive filtering using discrete Fourier transform calculations on the training signal, and receivers are described that initialize the parameters of the adaptive filtering using the results of match filtering for the particular pseudo-random noise sequence.

23 Claims, 21 Drawing Sheets

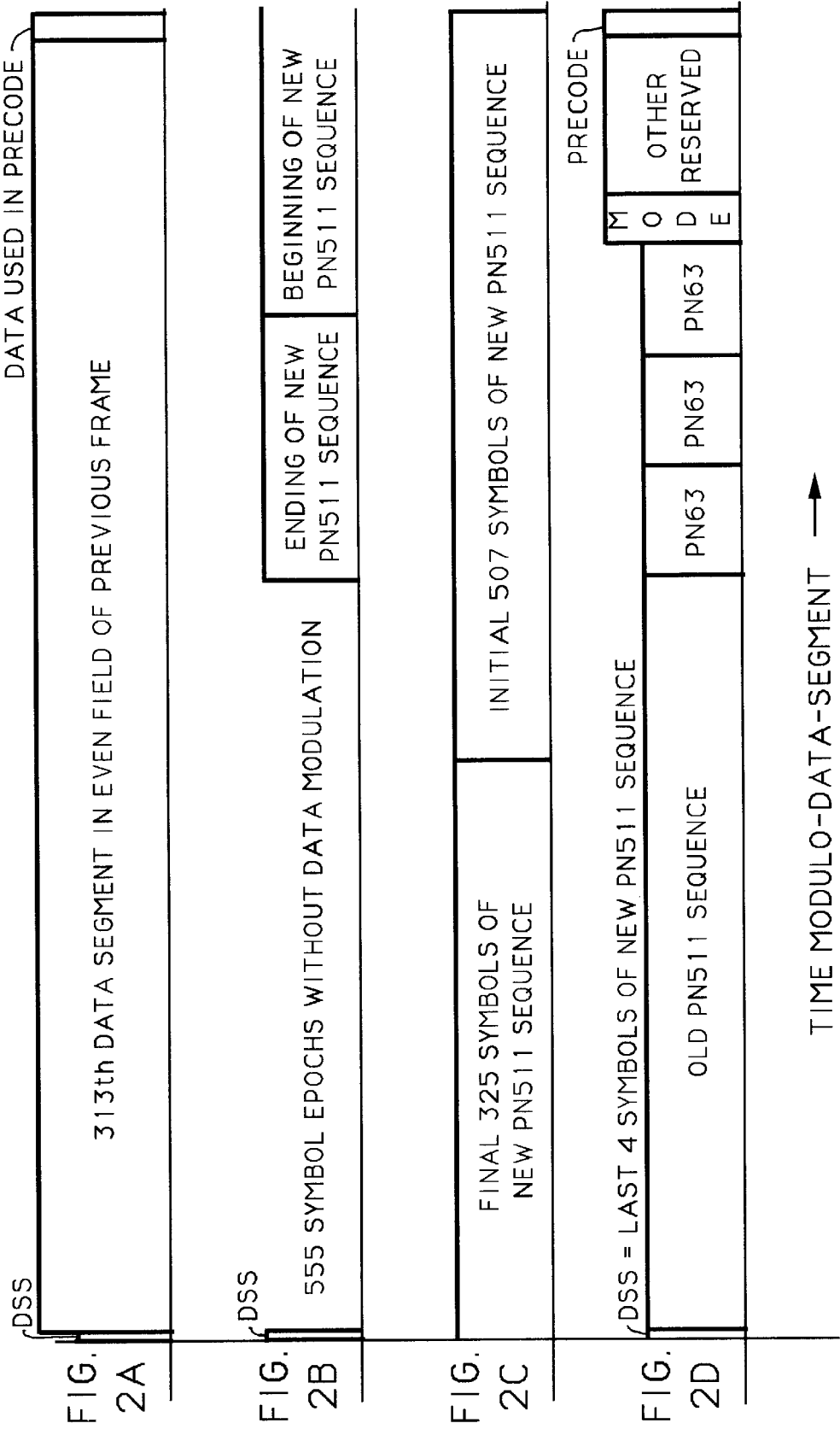

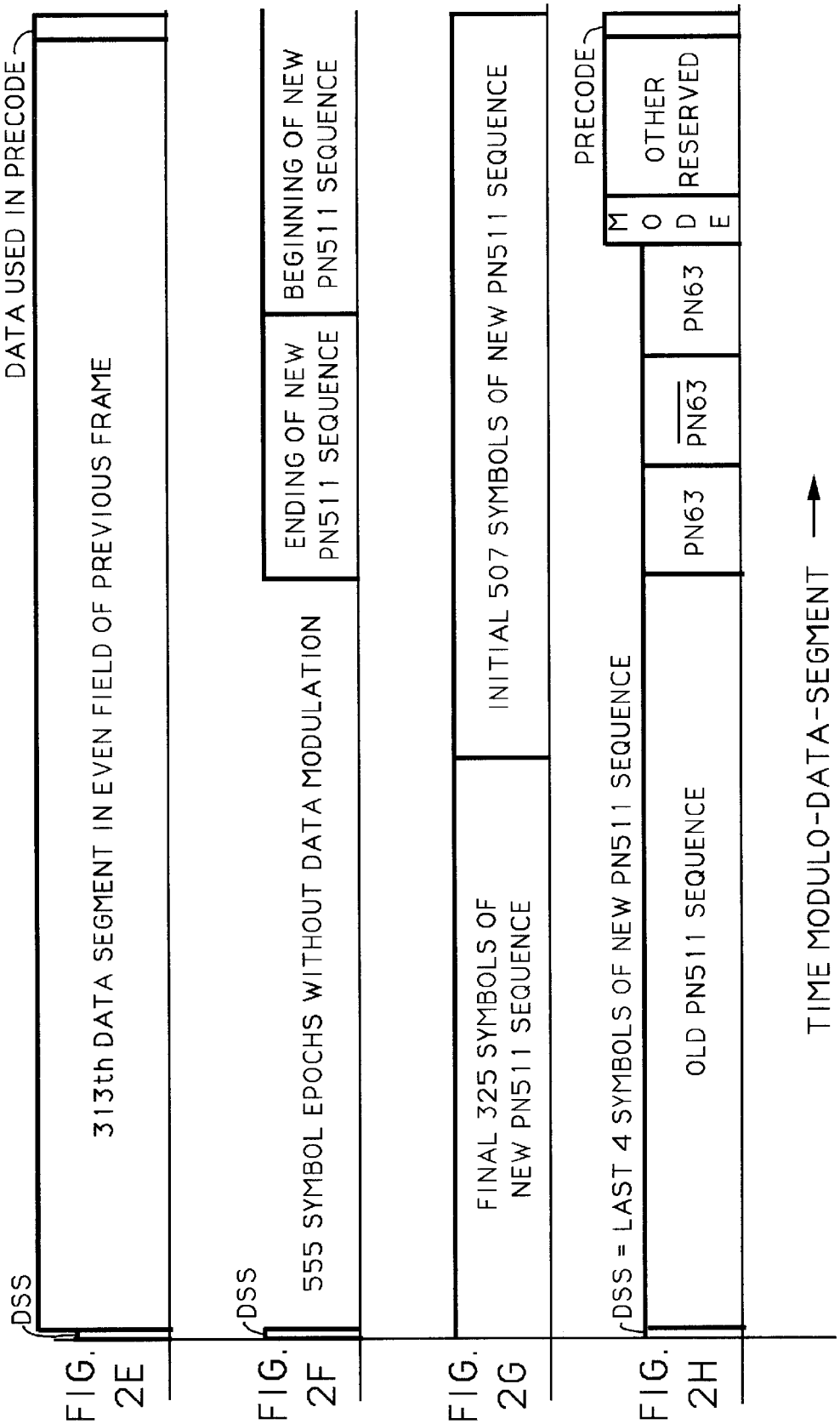

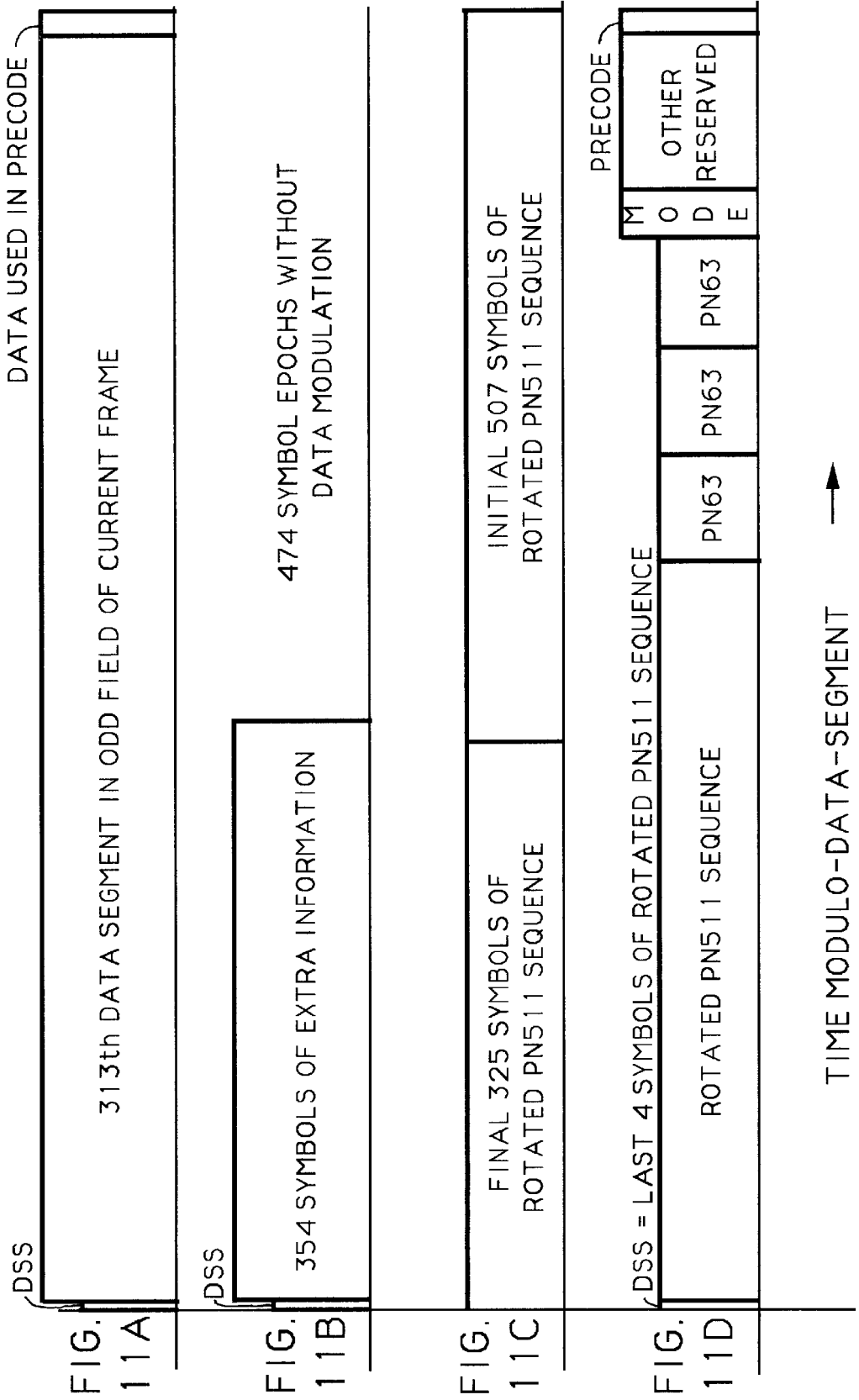

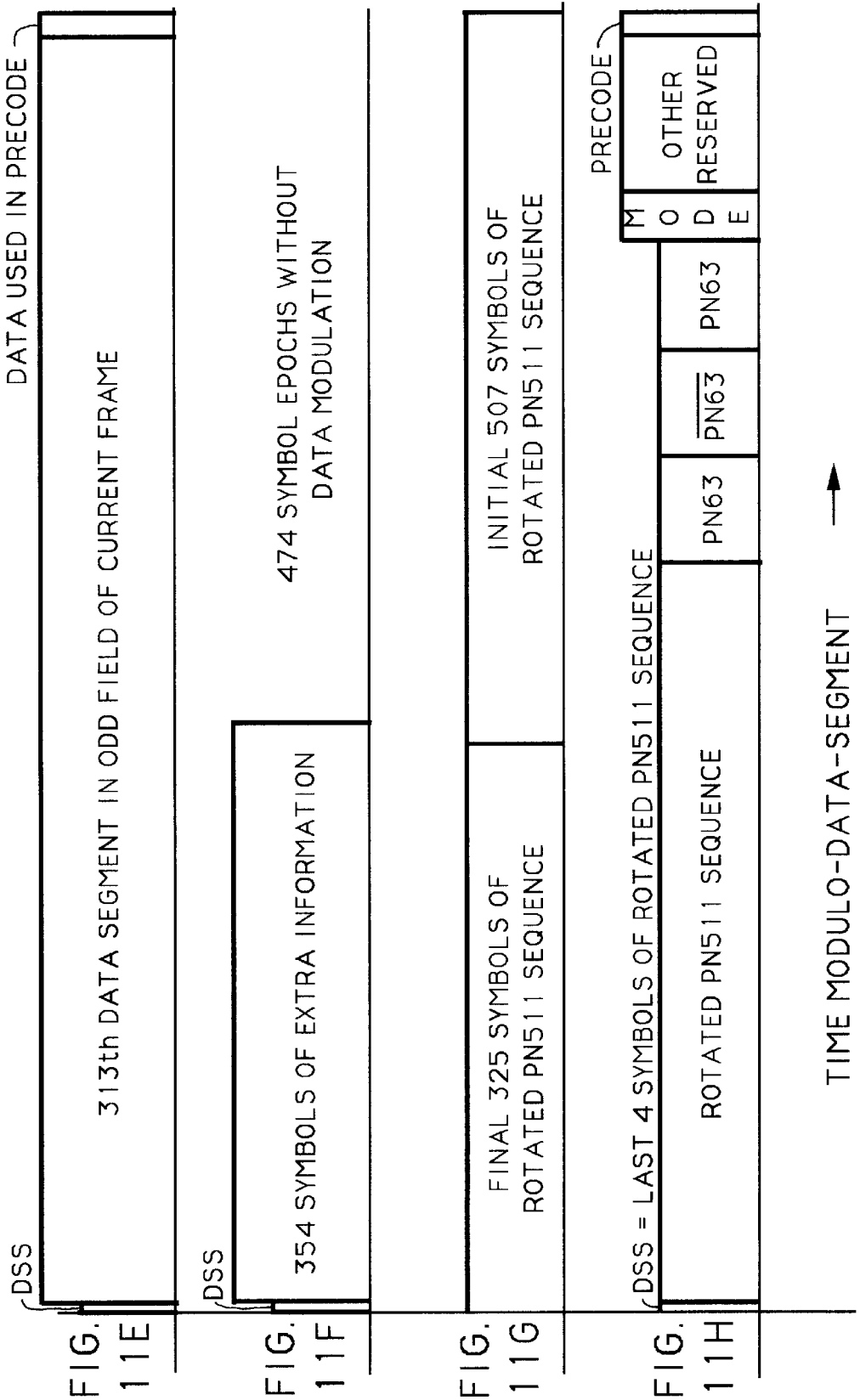

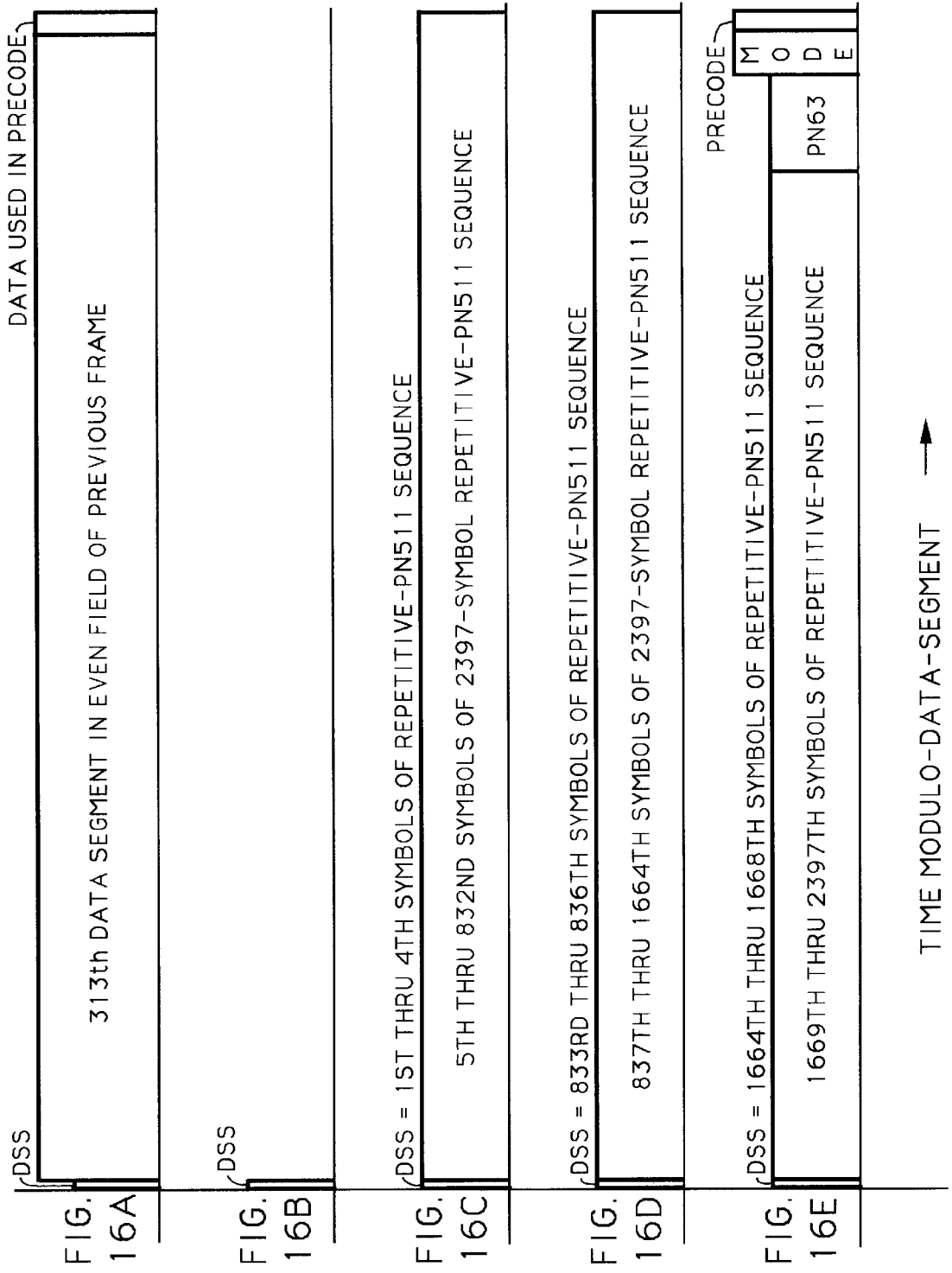

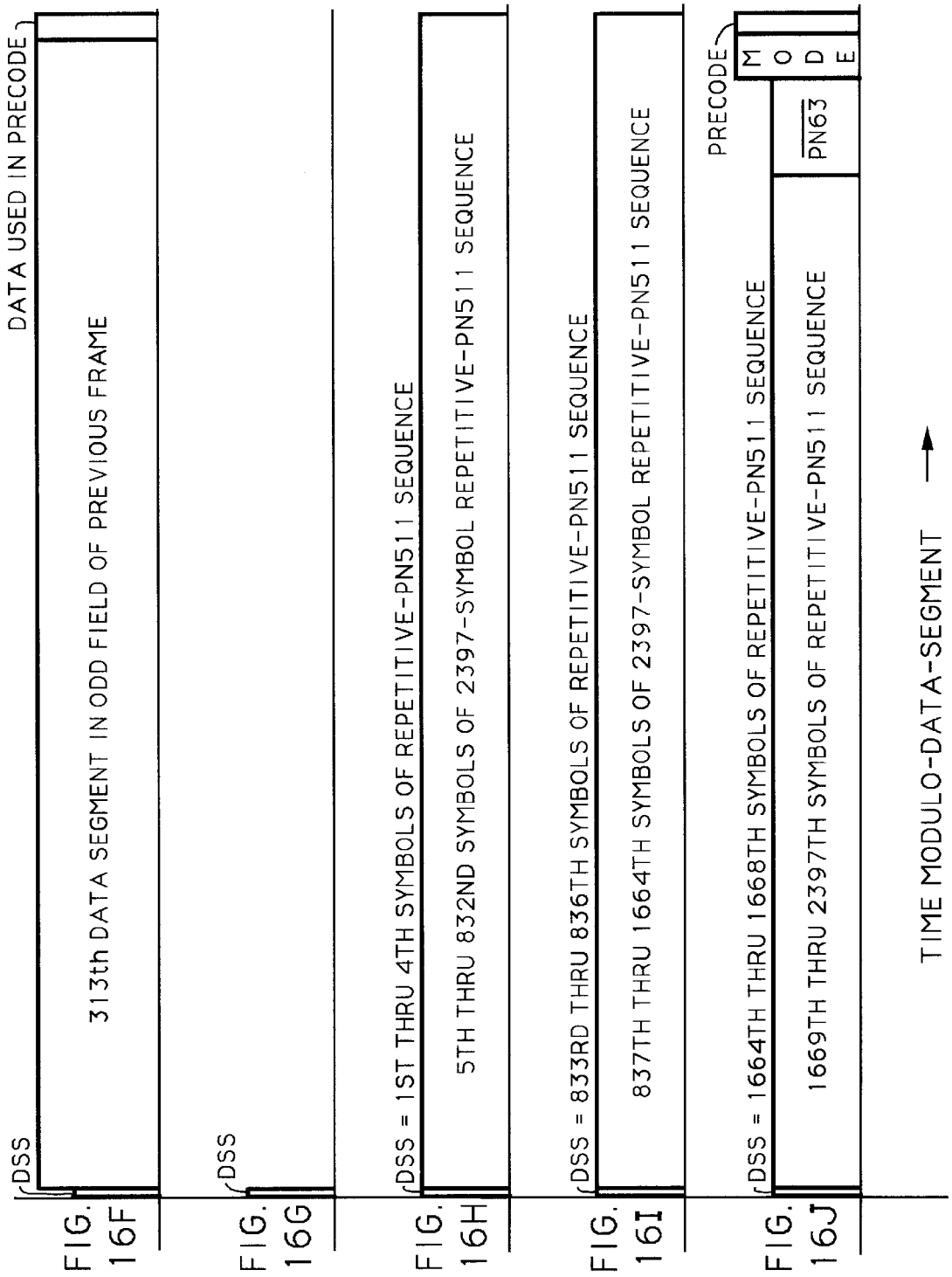

GHOST CANCELLATION REFERENCE SIGNALS FOR BROADCAST DIGITAL TELEVISION SIGNAL RECEIVERS AND RECEIVERS FOR UTILIZING THEM

This application is filed under 35 U.S.C. 111(a) claiming pursuant to 35 U.S.C. 119(e)(1) benefit of the filing date of provisional application Ser. No. 60/177,080 filed Jan. 19, 2000, pursuant to 35 U.S.C. 111(b).

The invention relates to receivers for broadcast digital television signals and, more particularly, to filtering for the cancellation of multipath distortion in the received signals, which filtering is adaptive responsive to training signals inserted into the broadcast digital television signals.

BACKGROUND OF THE INVENTION

The Advanced Television Systems Committee (ATSC) published its A/53 Standard for Digital Television Broadcasting in 1995; and that standard is referred to simply as "A/53" in the rest of this specification. In 1995 ATSC also published its A/54 Guide to the Use of the ATSC Digital Television Standard, which guide is referred to simply as "A/54" in the rest of this specification.

The broadcast digital television signal to which the receiver synchronizes its operations is called the principal signal, and the principal signal is usually the direct signal received over the shortest transmission path. The multipath signals received over other paths are thus usually delayed with respect to the principal signal and appear as lagging ghost signals. It is possible however, that the direct or shortest path signal is not the signal to which the receiver synchronizes. When the receiver synchronizes its operations to a (longer path) signal that is delayed respective to the direct signal, there will be a leading ghost signal caused by the direct signal, or there will a plurality of leading ghost signals caused by the direct signal and other reflected signals of lesser delay than the signal to which the receiver synchronizes. While the term "ghost" was usually used by workers in the analog television art to refer to a multipath signal component other than the principal signal, many workers in the digital television art customarily refer to the multipath signal component using the term "echo signal" or the shorter term "echo" because of its similarity to a reflection on a transmission line. The leading ghost signals are referred to as "pre-ghosts" or "pre-echoes", and the lagging ghost signals are referred to as "post-ghosts" or "post-echoes". The ghost or echo signals vary in number, amplitude and delay time from location to location and from channel to channel at a given location. On Jan. 19, 2000, A. L. R. Limberg filed U.S. provisional application Ser. No. 60/177,080 titled "GHOST CANCELLATION REFERENCE SIGNALS FOR BROADCAST DIGITAL TELEVISION SIGNAL RECEIVERS AND RECEIVERS FOR UTILIZING THEM", which application is incorporated herein by reference and is referred to simply by its serial number in following portions of this specification. At the time 60/177,080 was filed, it was generally assumed that post-ghosts with significant energy are seldom delayed more than forty microseconds from the reference signal and that pre-ghosts with significant energy seldom precede the reference signal more than three to four microseconds.

Ghost signals that are displaced in time from the principal signal substantially less than a symbol epoch, so as to affect channel frequency response, but not enough to overlap symbols with ghosts of symbols more than a symbol epoch away are sometimes referred to as "microghosts". These short-delay or close-in microghosts are most commonly caused by unterminated or incorrectly terminated radio frequency transmission lines such as antenna lead-ins or cable television drop cables. Ghost signals that are displaced in time from the principal signal by most of a symbol epoch or by more than one symbol epoch are sometimes referred to as "macroghosts" to distinguish them from "microghosts".

The transmission of the digital television (DTV) signal to the receiver is considered to be through a transmission channel that has the characteristics of a sampled-data time-domain filter that provides weighted summation of variously delayed responses to the transmitted signal. In the DTV signal receiver the received signal is passed through channel-equalization and ghost-suppression filtering that compensates at least partially for the time-domain filtering effects that originate in the transmission channel. This channel-equalization and ghost-suppression filtering is customarily sampled-data filtering that is performed in the digital domain. Time-domain filtering effects differ for the channels through which broadcast digital television signals are received from various transmitters. Furthermore, time-domain filtering effects change over time for the broadcast digital television signals received from each particular transmitter. Changes referred to as "dynamic multipath" are introduced while receiving from a single transmitter when the lengths of reflective transmission paths change, owing to the reflections being from moving objects. Accordingly, adaptive filtering procedures are required for adjusting the weighting coefficients of the sampled-data filtering that provides ghost-cancellation and equalization.

Determination of the weighting coefficients of the sampled-data filtering that provides channel equalization and ghost suppression is customarily attempted using a method that relies on analysis of the effects of ghosting on all portions of the transmitted signal or using a method that relies on analysis of the effects of ghosting on a training signal or ghost-cancellation reference (GCR) signal included in the transmitted signal specifically to facilitate such analysis. While the data field synchronizing (DFS) signals in the initial data segments of the data fields in the DTV signal specified by A/53 were originally proposed for use as a training signal sequence, they are not well-designed for such purpose. So, most DTV manufacturers have attempted to use decision-feedback methods that rely on analysis of the effects of ghosting on all portions of the transmitted signal for adapting the weighting coefficients of the sampled-data filtering. Decision-feedback methods that utilize least-mean-squares (LMS) method or block LMS method can be implemented in an integrated circuit of reasonable size. These decision-feedback methods provide for tracking dynamic multipath conditions reasonably well after the channel-equalization and ghost-suppression filtering has initially been converged to substantially optimal response, providing that the sampling rate through the filtering is appreciably higher than symbol rate, and providing that the rates of change of the dynamic multipath do not exceed the stewing rate of the decision-feedback loop. However, these decision-feedback methods tend to be unacceptably slow in converging the channel-equalization and ghost-suppression filtering to nearly optimal response when initially receiving a ghosted DTV signal. Worse yet, convergence is too slow when tracking of dynamic multipath conditions must be regained after the stewing rate of the decision-feedback loop has not been fast enough to keep up with rapid change in the multipath conditions. Data-dependent equalization and ghost-cancellation methods that provide faster convergence than LMS or block-LMS decision-feedback methods are known, but there is difficulty in implementing them in an integrated circuit of reasonable size. Since 60/177,080 was filed, progress has been made with regard to initializing the parameters of the adaptive filter used for echo suppression by data-directed methods, particularly by the "constant amplitude modulus" method. However, it is still desirable to introduce into the A/53 DTV signal a training signal which does not interfere with the operation of DTV signal receivers already in the field and which will rapidly adjust the channel-equalization and ghost-suppression filtering for substantially optimal response.

A/53 specifies the last twelve symbols of the initial data segment of each data field repeat the last twelve symbols of the final data in the preceding data field as a precode signal. This precode signal is specified to implement resumption of trellis coding in the second data segment of each field proceeding from where trellis coding left off processing the data in the preceding data field. This relationship between the initial and second data segments of each data field cannot be disrupted by the introduction of the training signal into the A/53 DTV signal if operation of DTV signal receivers constructed in accordance with A/53 is to be least affected. So, the introduction of the training signal between the initial and second data segments of each data field is undesirable, 60/177,080 points out.

A/53 specifies convolutional interleaving of the data contained in the second through $313^{th}$ data segments of each data field. These second through $313^{th}$ data segments of each data field must remain consecutive in time if operation of de-interleavers in DTV signal receivers constructed in accordance with A/53 is to be least affected, 60/177,080 points out.

In accordance with the observations set forth in the preceding two paragraphs, the training signal is best introduced in one or more data segments introduced after the $313^{th}$ data segment of each data field, in a modification of A/53, 60/177,080 indicates. DTV signal receivers already in the field should have the capability of processing the first complete data field that occurs after a channel change, A/60/177,080 indicates, based on the belief that capability should enable these receivers to accommodate the insertion of additional data segments into each data field. Insertion of two additional data segments per data frame, such as one additional data segment per data field, will reduce data frame rate from 20.66 frames per second to 20.59 frames per second with a 0.32% loss in channel capacity compared to A/53. Insertion of four additional data segments per data frame, such as two additional data segments per data field, will reduce data frame rate from 20.66 frames per second to 20.52 frames per second with a 0.64% loss in channel capacity compared to A/53. Insertion of six additional data segments per data frame, such as three additional data segments per data field, will reduce data frame rate from 20.66 frames per second to 20.46 frames per second with a 0.95% loss in channel capacity compared to A/53.

It is further indicated in 60/177,080 that the twelve-symbol precode signal should no longer repeat the last twelve symbols of the final data segment in the preceding data field, supposing any further data segment containing training signal were introduced at the close of the preceding data field. Instead, the twelve-symbol precode signal should repeat the last twelve symbols of the final data in the preceding data field as it occurs in the $313^{th}$ data segment of each data field. That is, the twelve-symbol precode signal should repeat the last twelve symbols of the data in the data segment of the preceding data field that precedes the data segment or contiguous data segments in which the training signal occurs. When preparing 60/177,080 for filing before the United States Patent and Trademark Office, A. L. R. Limberg sought preferred types of training signal for inclusion in the additional data segments to be inserted into the A/53 data fields. The training signal should have sufficient energy that the longest delayed ghosts of the training signal have sufficient energy that match filtering using autocorrelation procedures can distinguish these ghosts from interference caused by other signals and by noise. Accordingly, training signals with substantial energy and well-defined autocorrelation responses are a desideratum.

The triple PN63 sequence in the initial data segment of each data field of a broadcast DTV signal as prescribed by A/53 has a well-defined autocorrelation response, but has insufficient energy for detecting longer-delayed post-ghosts with smaller amplitudes. The PN511 sequence in the initial data segment of each data field of a broadcast DTV signal as prescribed by A/53 has substantial energy and a well-defined autocorrelation response. However, no component sequence of the data field synchronizing (DFS) signal or combination of its component sequences has proven in practice to be very satisfactory as a training signal.

One reason is that no portion of the DFS signal is preceded by an information-free interval of sufficient duration that post-ghosts of previous data and data segment synchronizing sequences exhibit insignificant spectral energy during the duration of that portion of the DFS signal to be used as training signal. Also, the A/53 DTV signals do not provide for the generation of an information-free interval of such duration before the training signal by combining information sent at different times, a technique used in de-ghosting NTSC analog television signals. An information-free interval extending over 431 symbol epochs should precede the training signal if it is not to be overlapped by the post-ghosts of previous signals delayed less than forty microseconds or so. When 60/177,080 was filed, it was presumed that post-ghosts delayed more than forty microseconds would not have significant mounts of energy. The post-ghosts of previous signals should be kept from contributing significantly to digitized Johnson noise, in order to preserve the sensitivity of ghost signal detection. It is desirable to extend the duration of this information-free interval by an additional 34 symbol epochs if pre-ghosts advanced by as much as three microseconds are to be detected or by an additional 43 symbol epochs if pre-ghosts advanced by as much as four microseconds are to be detected.

Another reason the PN511 sequence in the initial data segment of each data field of an ATSC broadcast DTV signal is not particularly satisfactory as a training signal is that the PN511 sequence is not repetitive, causing the autocorrelation properties of the PN511 sequence to be compromised. The reader is referred to U.S. Pat. No. 5,065,242 titled "DEGHOSTING APPARATUS USING PSEUDORANDOM SEQUENCES" issued Aug. 23, 1994 to Charles Dietrich and Arthur Greenberg. This patent, incorporated herein by reference, points out that the autocorrelation function of a maximal-length pseudorandom noise (PN) sequence has a circular nature. U.S. Pat. No. 5,065,242 describes repetitive PN sequences being inserted as training signal into a prescribed scan line interval of each of the vertical blanking intervals of NTSC analog television signals.

In this specification and the claims appended thereto she phrase "repetitive pseudo-random noise sequence" is to be construed as being descriptive of a single continuous sequence, rather than as being descriptive of an intermittently repeated pseudo-random noise sequence. The cycle of a repetitive maximal-length PN sequence is defined in this specification and the claims appended thereto to extend over time until the "random" pattern of binary values thereof begins to repeat. This definition is not at variance with common usage. The cycle of a repetitive maximal-length PN sequence is measured by the time between peaks of the autocorrelation function of the PN sequence.

A many-symbol PN sequence has a reasonably uniform spectrum above zero frequency, so it is suitable for calculating the channel equalization function in the frequency domain particularly if its symbol rate is Nyquist rate—i.e., twice channel bandwidth. U.S. Pat. No. 5,065,242 prescribes channel equalization calculations be implemented using fast Fourier transform (FFT) or discrete Fourier transform (DFT) methods to determine the cepstrum of the transmission/reception channel. The time-domain response of a transmission/reception channel to an impulse, referred to as a "cepstrum", takes the form of a succession of pulses at time intervals indicative of the relative delays of respective multipaths and with amplitudes indicative of the relative amplitudes of those multipaths. U.S. Pat. No. 5,065,242 requires the PN sequences with ($2^n-1$) symbols be "raster-mapped" or stretched in time by to be one symbol epoch longer and thus be of duration equal to $2^n$ symbol epochs, where n is a positive integer greater than one. U.S. Pat. No. 5,065,242 indicates that this stretching, which is done either at the transmitter or the receiver, is done to implement processing of signals by DFT methods to determine the cepstrum.

Such raster-stretching methods are acceptable when dealing with NTSC analog television signals, since the video components of these signals are under-sampled. While the frequency spectrum of the raster-stretched PN sequence signal is reduced compared to a PN sequence with baud-rate symbols, it is still wider than the video components of the NTSC analog television signals. Accordingly, adaptation of the channel-equalization and ghost-suppression filter for optimizing the spectral response of the raster-stretched PN sequence signal over its bandwidth will optimize the spectral response of the video components of the NTSC analog television signals. However, raster-stretching methods are not suitable for A/53 digital television signals, which are sampled at Nyquist rate during their transmission. The adaptation of the channel-equalization and ghost-suppression filter should optimize the spectral response over the bandwidth of a PN sequence with baud-rate symbols, in order that the spectral response over the entire Nyquist bandwidth of the A/53 digital television signals is optimized. This is necessary so that in a receiver for A/53 digital television signals, the baseband digital television signals are Nyquist filtered to limit their bandwidth to one-half the symbol rate before the data slicing procedures used for symbol decoding. In accordance with the Sampling Theorem, such Nyquist filtering eliminates intersymbol interference between symbols occurring at the specified symbol rate. Improper filtering in the Nyquist slope region results in undesirable intersymbol interference.

It is pointed out in 60/177,080 that there is no need for stretching of the PN sequence system function to facilitate searching for ghost positions with a match filter in order to determine the cepstrum. The repetition of a sequence having an autocorrelation function that is circular (i.e., cyclically repeating) in nature permits match filtering using autocorrelation procedures over intervals free from signals other than the training signal and any ghost thereof that could contribute to match filtering response. Only noise contributions to match filter response need be considered when determining the match filter capability to detect weak-energy ghosts of the training signal.

Computation of the cepstrum by DFT methods can be done by extending the PN sequence composed of equal-value positive and negative samples by enough zero-valued null samples to have $2^p$ samples, where p is a positive integer greater than one and where $2^p$ is more than twice the number of symbols in the PN sequence, without spectral content in relative amplitude terms being appreciably affected. Indeed, DFT used in such calculations presumes the signal segment being transformed is flanked by zero-valued samples anyway. Accordingly, as was pointed out in 60/177,080, repetitive PN sequences with symbols at customary baud rates are suitable training signals for inclusion in digital television signals, especially if suitable precautions are taken in positioning these repetitive PN sequences in the DTV signals.

Since 60/177,080 was filed, pre-echoes leading the strongest multipath signal component by as much as thirty microseconds have been reported as being observed during the field testing of DTV receivers using indoor antennas. Furthermore, post-echoes lagging the strongest multipath signal component by about sixty microseconds were reported to have been observed in the New York city area, which post-echoes are caused by reflections from the suspension bridge across the Verrazano Straits. DTV receivers for accommodating ranges of significant echo energy that extend over as much as 90 microseconds have been proposed by A. L. R. Limberg, modifying the teachings in 60/177,080 so as to use repetitive-PN1023 sequences as training signals.

SUMMARY OF THE INVENTION

In an aspect of the invention training signals for adaptive channel-equalization and ghost-suppression filtering in receivers for broadcast digital television signals are inserted in those broadcast DTV signals, which training signals consist of similar symbol sequences, each of which symbol sequences reposes within plural consecutive data segments and incorporates each data segment synchronizing (DSS) signal therebetween. In a further aspect of this invention, each training signal is preceded in the broadcast TV signal by a respective information-free interval of a prescribed number of symbol epochs. In a further aspect of this invention, each training signal is a repetitive pseudorandom-noise (PN) sequence continuing more than six hundred symbol epochs, to facilitate receivers for broadcast TV signals detecting the relative positions and amplitudes of the principal signal and its post-ghosts delayed as much as forty microseconds therefrom. In a still further aspect of this invention, the inclusion of each training signal in the broadcast TV signal is accommodated by adding at least one additional data segment near the conclusion of each data field to increase the number of data segments in each data field to more than 313.

Other aspects of the invention are embodied in receivers for receiving broadcast DTV signals and for utilizing the training signals specified in the foregoing paragraph. Certain digital television receivers embodying the invention use the repetitive PN sequence as the basis for calculating the initial values of the weighting coefficients of the adaptive filtering used for channel equalization and ghost suppression. Thereafter, the weighting coefficients are updated by decision-feedback techniques relying on received data or by repetition of the method used to initialize those weighting coefficients.

Certain digital television receivers embodying the invention include novel pedestal-suppression filters cascaded before match filters for PN sequences. These pedestal-suppression filters separate the repetitive PN sequences used as training signals from accompanying direct component generated during the synchronous detection of broadcast TV signals. The repetitive PN sequences separated in the responses of the pedestal-suppression filters supply input signals for the match filters, the responses of which match filters are used for generating cepstrum signals that locate the timing and amplitudes of ghosts relative to the principal received signals.

BRIEF DESCRIPTION OF THE DRAWING

FIGS. 2A, 2B, 2C, 2D, 2E, 2F, 2G and 2H depict the symbol contents of respective data segments in a broadcast digital television signal transmitted together with a first general type of ghost cancellation reference signal in accordance with one aspect of the invention.

FIGS. 3 and 4 diagram respective PN511 sequences, either of which can be employed in the data segments graphed in FIGS. 2B, 2C, 2D, 2F, 2G and 2H.

FIG. 7 diagrams another PN511 sequence that can be employed in the data segments graphed in FIGS. 2B, 2C, 2D, 2F, 2G and 2H.

FIGS. 11A, 11B, 11C, 11D, 11E, 11F, 11G and 11H depict the symbol contents of respective data segments in a broadcast digital television signal transmitted together with a second general type of ghost cancellation reference signal in accordance with another aspect of the invention.

FIGS. 12 and 13 diagram respective PN511 sequences, either of which can be employed in the data segments graphed in FIGS. 11B, 11C, 11D, 11F, 11G and 11H.

FIG. 15 diagrams a rotated PN511 sequence that can be employed in the data segments graphed in FIGS. 14A, 14B and 14C.

FIGS. 16A, 16B, 16C, 16D, 16E, 16F, 16G, 16H, 16I and 16J depict the symbol contents of respective data segments in a broadcast digital television signal transmitted together with a fourth general type of ghost cancellation reference signal in accordance with another aspect of the invention.

DETAILED DESCRIPTION

Figure 1:
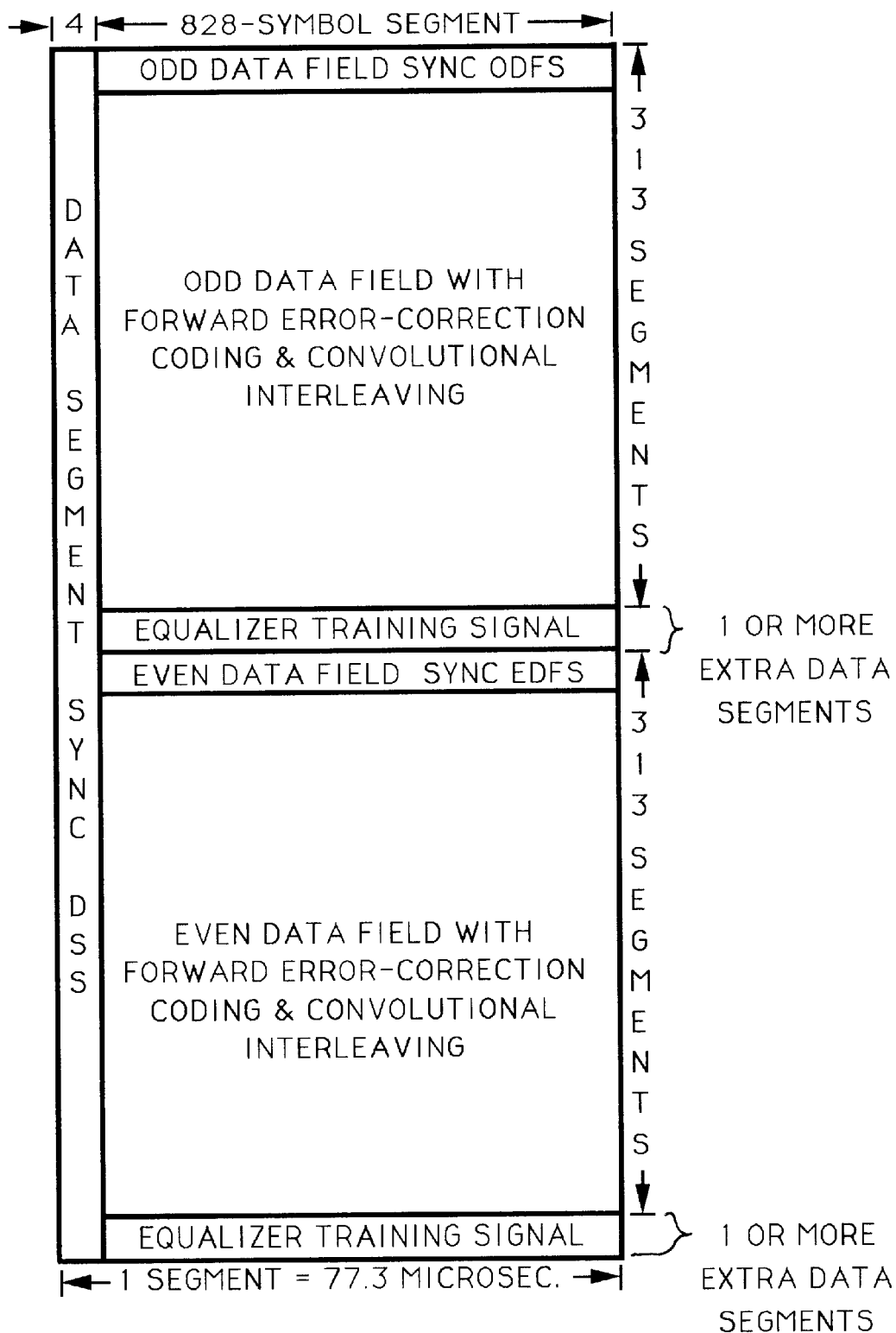
FIG. 1 is a diagram of an ATSC digital television signal data frame modified in accordance with the invention to include one or more extra data segments at the end of each of its two data fields, which extra segments contain training signals for equalization and ghost-cancellation filtering.

FIGS. 2A, 2B and 2C depict the symbol contents of the $313^{th}$, $314^{th}$ and $315^{th}$ data segments of the even data field of a data frame in a broadcast digital television signal; and FIG. 2D graphs the symbol contents of the initial data segment of the odd data field of the succeeding data frame. FIGS. 2E, 2F and 2G depict the symbol contents of the $313^{th}$, $314^{th}$ and $315^{th}$ data segments of that odd data field of that succeeding data frame; and FIG. 2H graphs the symbol contents of the initial data segment of the even data field of that succeeding data frame. The second through $313^{th}$ data segments of the data fields do not differ from those in the A/53 DTV signal. The data frames are modified from A/53 and are of the general type shown in FIG. 1. More specifically, the data frames in this broadcast DTV signal are modified to include additional $314^{th}$ and $315^{th}$ data segments in each data field. These additional data segments contain a first type of ghost cancellation reference signal, which does not affect the initial data segments of the data fields appreciably. The initial data segment of an odd data field, as shown in FIG. 2D, and the initial data segment of an even data field, as shown in FIG. 2H, each conclude with a respective 12-symbol precode. Each 12-symbol precode still repeats the final twelve symbols in the $313^{th}$ data segment of the previous data field, but no longer repeats the final twelve symbols in the previous data segment.

The initial data segment of an odd data field, as shown in FIG. 2D, and the initial data segment of an even data field, as shown in FIG. 2H, each begin with a 4-symbol data segment sync (DSS) sequence followed by a PN511 sequence as prescribed in A/53. This 511-symbol pseudo-random noise (PN) sequence is denominated "OLD PN511 SEQUENCE" in FIGS. 2D and 2H. In FIG. 2D the "OLD PN511 SEQUENCE" is followed by a 189-symbol triple PN63 sequence, a 24-symbol mode code, and 104 reserved symbol epochs including the 12-symbol precode that concludes the data segment. In FIG. 2H the "OLD PN511 SEQUENCE" is followed by a 189-symbol triple PN63 sequence differing from that in FIG. 2D in that the middle PN63 sequence in the triple PN63 sequence is opposite in sense of polarity to the other PN63 sequences. In FIG. 2H the triple PN63 sequence is followed by a 24-symbol mode code and 104 reserved symbol epochs including the 12-symbol precode that concludes the data segment. The 92 symbols preceding the 12-symbol precode that concludes the data segment are denominated as the "other reserved" portion of an initial data segment of a data field in this specification and the accompanying drawing.

FIGS. 2B and 2C show the $314^{th}$ and $315^{th}$ data segments of the even field of a data frame including a repetitive PN511 sequence that concludes with the first four symbols of the initial data segment of the odd field of the next data frame. FIGS. 2F and 2G show the $314^{th}$ and $315^{th}$ data segments of the odd field of a data frame including a repetitive PN511 sequence that concludes with the first four symbols of the initial data segment of the even field of that data frame. The 511-symbol pseudorandom noise (PN) sequence in the repetitive PN511 sequences is denominated "NEW PN511 SEQUENCE" in FIGS. 2B, 2C, 2F and 2G. The "NEW PN511 SEQUENCE" of FIGS. 2B, 2C, 2F and 2G varies between −5 and +5 modulation levels A/53 prescribes for an 8-VSB DTV signal. This facilitates the 4-symbol data segment sync (DSS) sequences being subsumed in the repetitive PN511 sequences. The "NEW PN511 SEQUENCE" of FIGS. 2B, 2C, 2F and 2G not only concludes with $508^{th}$, $509^{th}$, $510^{th}$ and $511^{th}$ symbols corresponding to the 4-symbol DSS sequence, its $183^{rd}$, $184^{th}$, $185^{th}$ and $186^{th}$ symbols also correspond to the 4-symbol DSS sequence. Accordingly, the DSS sequence at the beginning of the $315^{th}$ data segment of each data field can be subsumed in the penultimate "NEW PN511 SEQUENCE" of the repetitive PN511 sequence, besides the DSS sequence at the beginning of the initial data segment of each data field being subsumed in the final "NEW PN511 SEQUENCE" of the repetitive PN511 sequence.

FIGS. 2B and 2F show a 555-symbol-epoch interval free of symbols following the 4-symbol DSS sequence at the beginning of the $314^{th}$ data segment of each data field. The repetitive PN511 sequence begins with only the ending of a "NEW PN511 SEQUENCE" in the $314^{th}$ data segment of each data field. At the time 60/177,080 was filed, the inventor believed that the 555-symbol-epoch interval free of symbols would be long enough that post-ghosts of the DSS sequence and data in the preceding $313^{th}$ data segment would not overlap the repetitive PN511 sequence so as to interfere with ghost signal detection procedures for determining multipath delays. At the time 60/177,080 was filed, the inventor believed that the 555-symbol-epoch interval free of symbols was essentially optimal insofar as maximizing ghost-cancellation capability is concerned, since this accommodates the same match filter detecting pre-ghosts as much as four microseconds before the principal signal and detecting post-ghosts as much as 51.6 microseconds after the principal signal. The match filter has a kernel corresponding to the "NEW PN511 SEQUENCE" rotated 44 symbol epochs in its cycle, rotation being in the sense to advance peak response.

Figure 3:
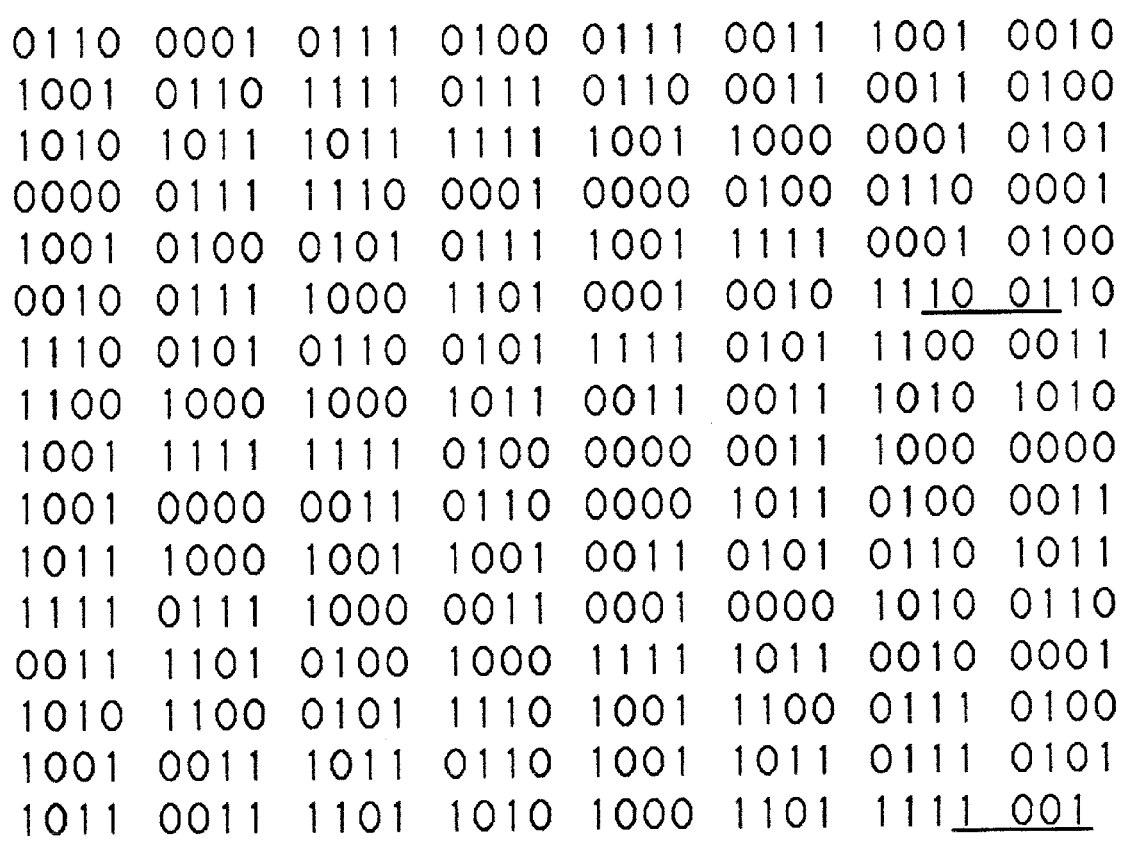
Figure 4:
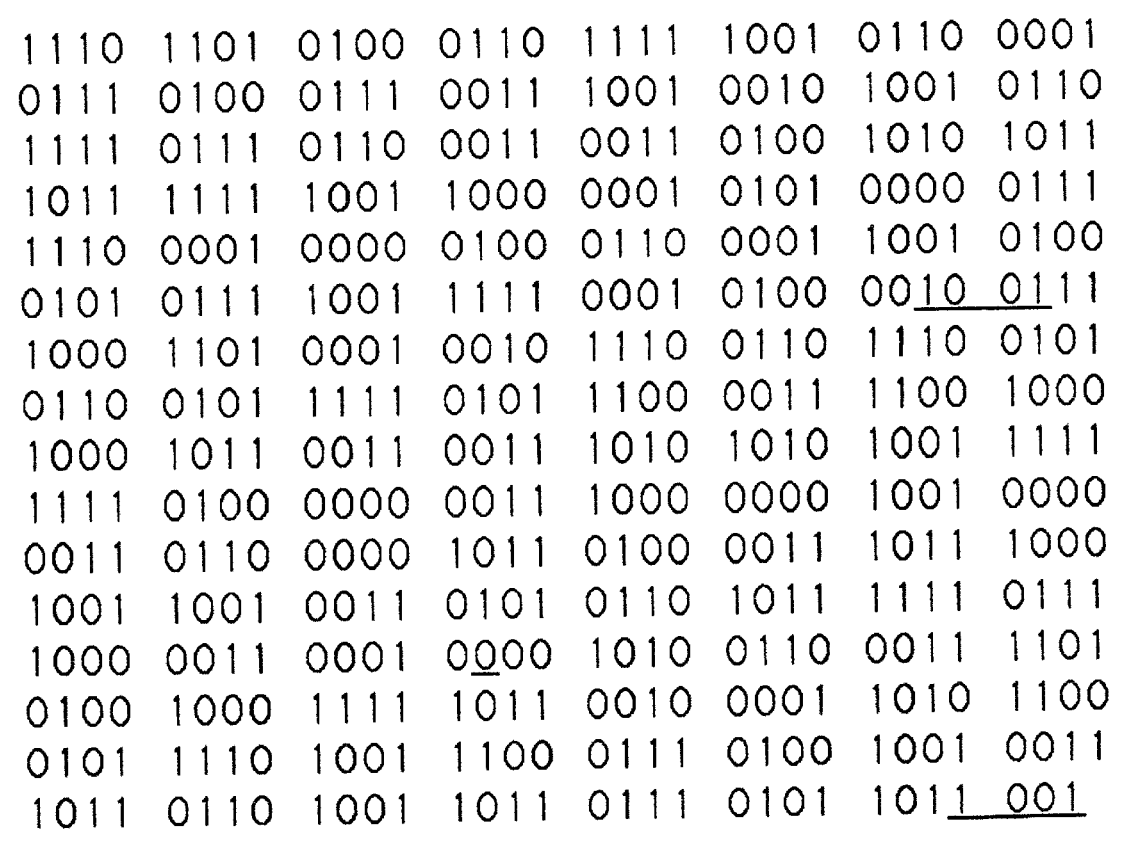

A final requirement placed on the "NEW PN511 SEQUENCE" was that it be "orthogonal" to the "OLD PN511 SEQUENCE" that A/53 prescribes. This requirement is made to avoid response to the "NEW PN511 SEQUENCE" from a match filter for the "OLD PN511 SEQUENCE" that might used to identify the initial data segments of data fields in DTV receivers already in the field. A simple way to attempt designing a new PN sequence that is "orthogonal" to an old PN sequence is to reverse the order of the old PN sequence and then rotate the order of symbols in the resulting sequence until other requirements on the new PN sequence can be satisfied. Reversing the order of the "OLD PN511 SEQUENCE" that A/53 prescribes and rotating the result, two satisfactory alternatives are found for the "NEW PN511 SEQUENCE". These alternatives are illustrated in FIGS. 3 and 4 of the drawing. The sequences are to be read row by row, left to right. The possible locations of DSS sequences are indicated by underscore. A ONE corresponds to +5 modulation level and a ZERO corresponds to −5 modulation level in the 8-VSB signal prescribed by A/53.

Since 60/177,080 was filed, post-ghosts of substantial energy that are delayed as much as 60 microseconds and pre-ghosts of substantial energy that are advanced as much as 30 microseconds have been observed in the field. The portions of the repetitive-PN511 sequence shown FIGS. 2B and 2F are preferably modified in view of these observations. Omitting the ending of the "NEW PN511 SEQUENCE" in the $314^{th}$ data segment of each data field increases the length of the interval in the $314^{th}$ data segment of each data field free of symbols from 555 symbol epochs to 642 symbol epochs. This decreases the likelihood of pre-ghosts of the "NEW PN511 SEQUENCE" being overlapped by post-ghosts of data in the $313^{th}$ data segment and by post-ghosts of the DSS sequence at the beginning of the $314^{th}$ data segment, which post-ghosts might have significant energy. The autocorrelation function of a PN511 match filter will discriminate considerably against long-delayed post-ghosts of data in the $313^{th}$ data segment, when such a PN511 match filter is being used to search for pre-ghosts of the "NEW PN511 SEQUENCE".

Figure 5:
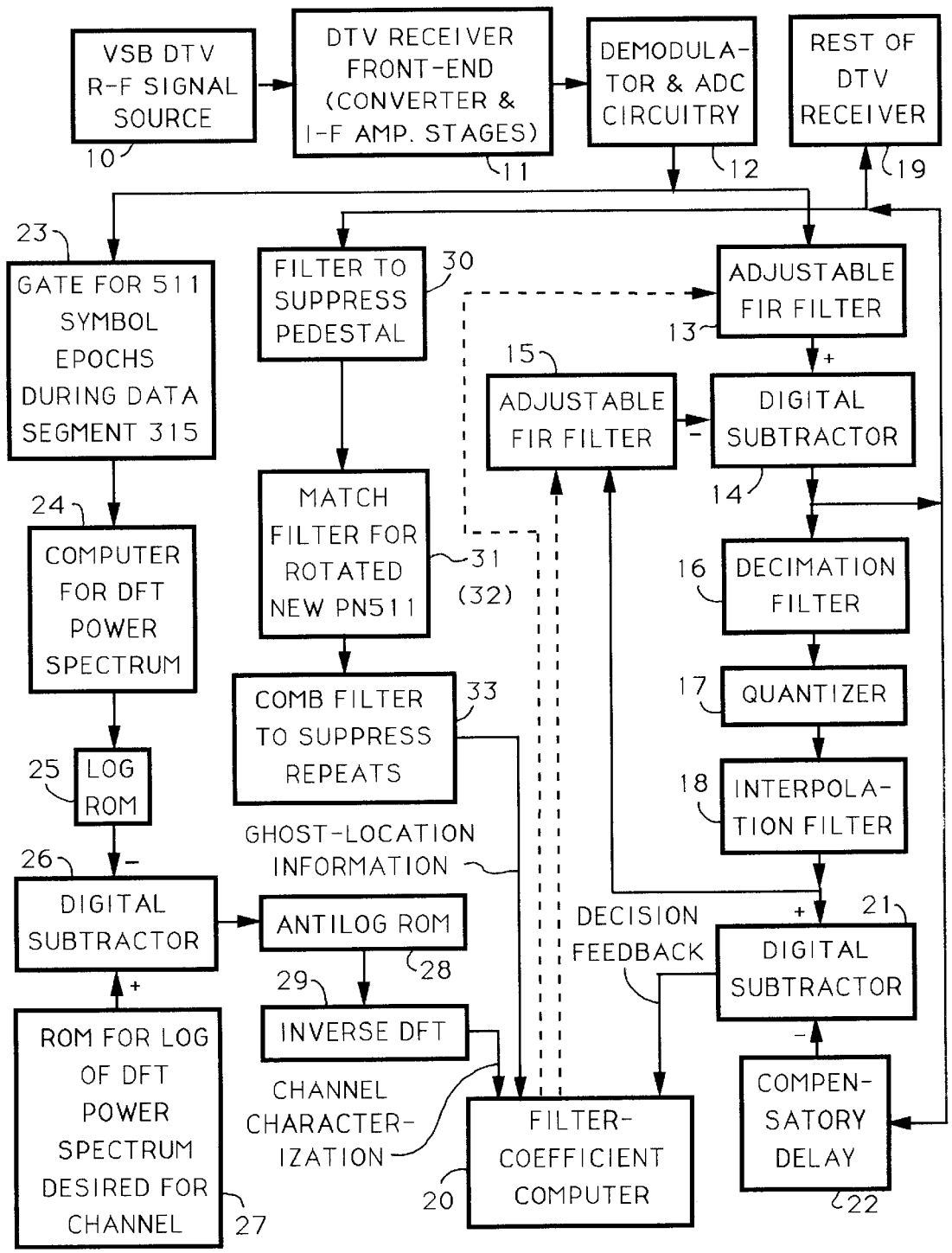
FIG. 5 is a schematic diagram of a receiver for broadcast digital television signals, which receiver in accordance with a further aspect of the invention includes structure capable of utilizing the ghost cancellation reference signal of FIGS. 2A, 2B, 2C, 2D, 2E, 2F, 2G and 2H when that GCR signal employs a PN511 sequence per FIG. 3 or 4.

FIG. 5 shows a receiver for broadcast digital television signals capable of utilizing the ghost cancellation reference signal of FIGS. 2B, 2C, 2D, 2F, 2G and 2H or the modification of that ghost cancellation reference signal described in the previous paragraph. A source 10 of radio-frequency vestigial-sideband DTV signal, such as a reception antenna, supplies that VSB DTV R-F signal to a DTV receiver front-end 11 comprising tuner and intermediate-frequency (I-F) amplifier stages. The DTV receiver front-end 11 supplies amplified intermediate-frequency signal to demodulator and analog-to-digital conversion circuitry 12. The circuitry 12 can take any one of a variety of known forms. Forms of the circuitry 12 in which the amplified I-F signal is digitized by an analog-to-digital converter before demodulation is done in the digital regime are preferred. Alternatively, forms of the circuitry 12 in which demodulation is done in the analog regime with the analog baseband demodulation result subsequently being digitized by an analog-to-digital converter are used instead. The analog-to-digital conversion is performed at a rate higher than the baud rate, so that the phase modulation of received signal that occurs during dynamic multipath reception can be tracked. Performing the analog-to-digital conversion at a multiple of baud rate is advantageous, because having an integral number of samples per symbol epoch simplifies the design of digital filters in the receiver. Match filters for PN sequences can be constructed without need for digital multipliers, for example.

Demodulator and analog-to-digital conversion circuitry 12 supplies digitized baseband DTV signal to adaptive filtering for performing channel equalization and ghost cancellation, which filtering can take a variety of known forms. FIG. 5 shows a currently preferred form of the adaptive filtering comprising a first finite-impulse-response (FIR) filter 13 with adjustable weighting coefficients followed in cascade by an infinite-impulse-response (IIR) filter composed of elements 14–18. The response of the first FIR filter 13 is supplied as the IIR filter input signal, which is applied as minuend input signal to a subtractor 14 in the IIR filter. The subtrahend input signal to the subtractor 14 is the response of a second FIR filter 15 with adjustable weighting coefficients. The subtractor 14 supplies its difference output signal as the IIR filter output signal, which is supplied as input signal to the rest 19 of the DTV receiver per conventional practice. The rest 19 of the DTV receiver will be described further on in this specification with reference to FIG. 19 of the drawing.

The IIR filter output signal is processed for application as input signal to the second FIR filter 15, completing a degenerative feedback loop through the second FIR filter 15, the subtractor 14 and intervening elements 16–18. This feedback loop provides the iterative filtering that gives rise to "infinite" impulse response. Alternatively, "infinite" impulse response could be obtained by directly applying the difference output signal from the subtractor 14 to the second FIR filter 15 as its input signal. However, adjustment of the weighting coefficients of the FIR filters 13 and 15 by data-directed methods is facilitated by replacing the filtered received signal by an estimation of the actually transmitted signal based on the filtered received signal. The output signal of the adaptive filtering for performing equalization and ghost-cancellation, which is supplied as difference output signal from the subtractor 14, is sampled at a rate higher than baud rate, preferably a multiple of baud rate. A decimation filter 16 responds to the difference output signal from the subtractor 14 to supply a quantizer 17 an input signal at baud rate. The quantizer 17 generates, at baud rate, estimates of the symbols actually transmitted. These estimates are applied as input signal to an interpolation filter 18 which resamples them to the same sample rate as the difference output signal from the subtractor 14. The interpolation filter 18 response is applied to the second FIR filter 15 as its input signal.

A small dedicated computer 20 computes weighting coefficients that are supplied to weighting coefficient registers for the FIR filters 13 and 15. (FIG. 5 does not show these weighting coefficient registers separately.) Whenever the DTV receiver is powered up after not receiving power for some time, whenever the reception channel is changed, or whenever the error-correction circuitry indicates a current set of weighting coefficients to be seriously in error, a set of weighting coefficients that have been derived from training signal are loaded into the computer 20. This set of weighting coefficients is then supplied to the weighting coefficient registers for the FIR filters 13 and 15, as well as providing a basis for the computer 20 further adjusting the weighting coefficients by a data-directed method utilizing a decision-feedback error signal generated by a digital subtractor 21 as its difference output signal. The digital subtractor 21 generates the decision-feedback error signal by comparing the output signal of the adaptive filtering for performing equalization and ghost-cancellation with estimates of the actually transmitted signal as resampled by the interpolation filter 18. More particularly, the response of the interpolation filter 18 is supplied to the subtractor 21 as its subtrahend input signal, and the difference output signal from the subtractor 14 is delayed by a digital delay line 22 before being applied to the subtractor 21 as its minuend input signal. The delay line 22 delays the subtractor 14 difference output signal sufficiently to compensate for the combined latent delays through the decimation filter 16, the quantizer 17 and the interpolation filter 18. The sampling rate of the decision-feedback error signal that the subtractor 21 generates as its difference output signal corresponds with the fractional-symbol tap spacing of the weighting coefficients of the FIR filters 13 and 15.

Of particular interest to the invention is the way that a set of initial weighting coefficients are determined from training signal. Demodulator and analog-to-digital conversion circuitry 12 supplies digitized baseband DTV signal to gating circuitry 23, which selects to a computer 24 a portion of the $315^{th}$ data segment that is 511 consecutive symbol epochs in duration and occurs early enough in that $315^{th}$ data segment not to contain pre-ghosts of the PN511 sequence in the first data segment of the next data field. The computer 24 is a small computer dedicated for calculating the DFT power spectrum of the portion of the $315^{th}$ data segment that the gating circuitry 23 selects to the computer 24. These calculations are performed after extending the selected signal with zero-value null samples so the set of samples supplied for DFT calculation contains a number of samples that is an integral power of two. Preferably, the zero-extension should extend the period of selected signal to just over twice its original period. This extension of the selected signal does not affect the spectral content of the signal being analyzed, except for reducing the amplitude of all detected spectral components in like measure, essentially halving them in amplitude. Making the zero-extension longer than the PN sequence reduces the effect that this discontinuity in the PN sequence cycle has on the relative amplitudes of the DFT components. Samples of the DFT power spectrum computed by the computer 24 are applied serially to linear-to-logarithm conversion read-only memory 25. The ROM 25 supplies its logarithmic samples to a digital subtractor 26 as its subtrahend input signal.

A read-only memory 27 serially generates samples of the logarithm of an ideal DFT power spectrum for the transmission channel and supplies those logarithmic samples to the subtractor 26 as its minuend input signal. The ideal DFT power spectrum for the transmission channel that is stored in the ROM 27 corresponds with the results of a lowpass filtering of the power spectrum for the PN511 sequence as extended by zero-value null samples to the same length as the zero-extended received PN511 sequence. The lowpass filtering is done with an ideal lowpass filter characteristic having a Nyquist slope roll-off that minimizes intersymbol interference. The difference output signal from the subtractor 26 is supplied to a read-only memory 28 that stores antilogarithm look-up tables. The response of the ROM 28 is the DFT of the system function of the departure of the reception channel from the ideal bandpass filter characteristic. The ROM 28 connects to inverse-DFT circuitry 29 for generating a time-domain response descriptive of this departure. This time-domain response is supplied to the computer 20, which uses this channel characterization as a basis for calculating initial coefficients for selective application to the coefficient registers of the FIR filters 13 and 15.

The problem is that there are errors in the time-domain response supplied from the inverse-DFT circuitry 29 as a channel characterization. Post-ghosts delayed more than half the duration of the PN sequence but less than its full duration wrap around in the cyclical DFT function to appear as pre-ghosts. Post-ghosts delayed more than the duration of the PN sequence wrap around in the cyclical DFT function to appear as incorrectly delayed post-ghosts. Pre-ghosts advanced more than half the duration of the PN sequence but less than its full duration wrap around in the cyclical DFT function to appear as post-ghosts.

Ghost-location information that can be used to suppress wrap-around of far-advanced pre-ghosts and much-delayed post-ghosts is generated in the following way in the FIG. 5 DTV receiver. Demodulator and analog-to-digital conversion circuitry 12 supplies digitized baseband DTV signal to a filter 30 for suppressing the pedestal component of that signal, which component arises from the synchronous detection of pilot signal. The filter 30 response is input signal for a match filter 31 for rotated FIG. 3 "NEW PN511 SEQUENCE" or, alternatively, for a match filter 32 for rotated FIG. 4 "NEW PN511 SEQUENCE". The match filter 31 or 32 response is supplied to a comb filter 33 for suppressing repeats of located ghosts that would otherwise occur owing to the cyclic nature of the repetitive "NEW PN511 SEQUENCE" supplied to the match filter 31 or 32 as input signal.

The ghost-location information is supplied to the computer 20. The computer 20 compares the amplitudes of the samples of ghost-location information to determine the group of largest-amplitude samples identifiable with the principal received signal and its microghosts. This selected group of samples consists of a number of samples a few more than the number of samples in a symbol epoch. The computer 20 doubles the amplitude of the selected group of samples, zero-extends the product to extend over the full sample range of the ghost-location information, and subtracts term-by-corresponding-term the full sample range of the ghost-location information from the extended product. This procedure inverts the ghost responses with respect to the principal signal. The computer 20 normalizes the amplitudes of the samples of the difference signal, based on the amplitude of the group of largest-amplitude samples, thereby generating the kernel of the ghost-suppression function that should be used to compensate for multipath distortion of the principal received signal.

Then, the computer 20 convolves the kernel of the ghost-suppression function with the time-domain response supplied from the inverse-DFT circuitry 29 to generate a time-domain response characterizing the departure of the actual reception channel from the ideal reception channel. The system function in Z transform of the adaptive filtering used for channel equalization and ghost suppression is the reciprocal of this time domain response. The terms of the time-domain response that arise from the detection of more delayed post-ghosts respectively determine the initial weighting coefficients the computer supplies to the coefficient register of the FIR filter 15 when initialization takes place. The system function in Z transform of the adaptive filtering used for channel equalization and ghost suppression is then divided by the response in Z transform of the IIR filter containing the FIR filter 15 in its feedback loop, to obtain the system function in Z transform that the FIR filter 13 should provide. The terms of this system function respectively provide the initial weighting coefficients the computer supplies to the coefficient register of the FIR filter 13 when initialization takes place.

Since 60/177,080 was filed, an alternative DTV receiver has come to be preferred by the inventor. In this alternative type of DTV receiver the Nyquist filtering is provided separately from the adaptive filtering used for channel equalization and ghost suppression. The ghost-location information from the comb-filtered PN511 match filter response directly determines the system function which the adaptive filtering is adjusted to compensate for, by providing the reciprocal system function.

Figure 6:
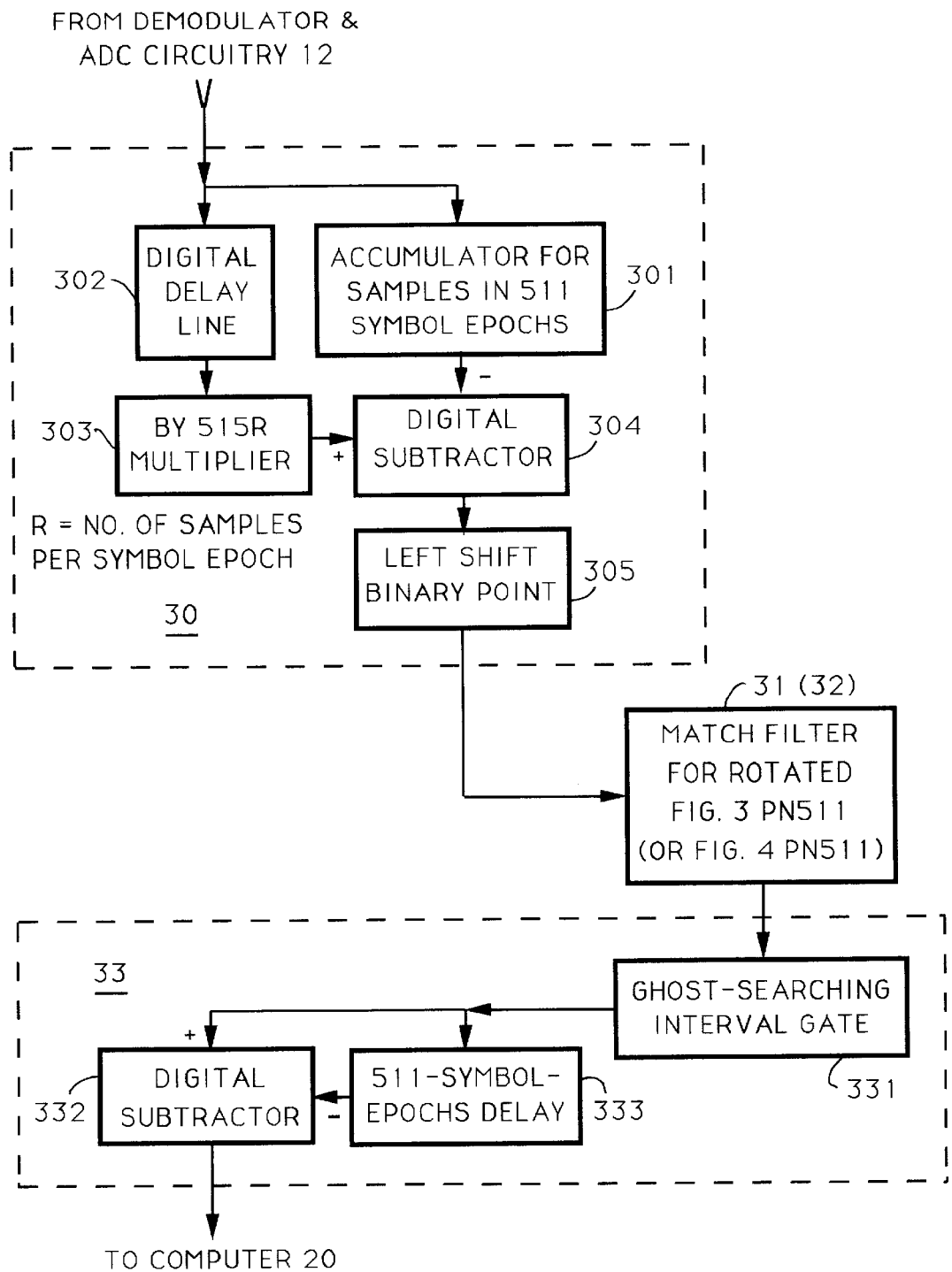
FIG. 6 is a detailed schematic diagram of the portion of the FIG. 5 receiver for broadcast digital television signals used to determine the positions of ghosts respective to the principal signal.

FIG. 6 shows in greater detail the construction of the circuitry for generating ghost-location information in the FIG. 5 DTV receiver. The filter 30 used to suppress the pedestal component of digitized baseband DTV signal arising from synchronous detection of the pilot carrier is of particular interest, since the filter 30 suppresses the pedestal by a technique different from that used to suppress the pedestal of GCR signals in NTSC analog television. That is, the pedestal-suppression filter 30 avoids the need for differentially combining oppositely poled PN sequences from successive fields to eliminate the direct pedestal component. In principle the filter 30 averages the 511R samples in an interval of 511 symbol epochs duration to determine the direct component of those samples, then subtracts the direct component from the samples before their application to the match filter 32 or 33 for the "NEW PN511 SEQUENCE". The multiplier R is the number of samples per symbol epoch. Since it is the scaling of the ghost signals to the principal signal that is primarily the information of interest in ghost location, rather than the absolute levels of these signals, the pedestal-suppression filter 30 shown in FIG. 6 is configured to avoid the division by 511R that is required for straightforward averaging of the 511R samples in an interval of 511 symbol epochs duration.

The pedestal-suppression filter 30 of FIG. 6 includes an accumulator 301 for accumulating 511R samples descriptive of one cycle of the "NEW PN511 SEQUENCE", as supplied from the demodulator and analog-to-digital conversion circuitry 12. The accumulator 301 will have as a component of its response a term 511R times as large as the direct component in each of the 511R samples in the one cycle of the "NEW PN511 SEQUENCE", which direct component arises from synchronous detection of pilot carrier that ideally has a +1.25 normalized modulation level. The accumulator 301 will have as another component of its response a term arising from the fact that the "NEW PN511 SEQUENCE" per FIG. 3 or FIG. 4 has one more symbol with +5 normalized modulation level than with −5 normalized modulation level. This other component of the accumulator 301 response will approach a level 4R times as large as the direct component in each of the 511R samples in the one cycle of the "NEW PN511 SEQUENCE". This other component of the accumulator 301 response has the same polarity as the direct component that arises from synchronous detection of pilot carrier. So the total accumulator 301 response at the end of the accumulation period spanning one cycle of the "NEW PN511 SEQUENCE" of FIG. 3 or 4 will approach a value 515R times as large as the direct component in each of the 511R samples in the one cycle of that sequence.

The pedestal-suppression filter 30 of FIG. 6 further includes a digital delay line 302 for delaying samples in the $314^{th}$ and $315^{th}$ data segments of each data field, as supplied from the demodulator and analog-to-digital conversion circuitry 12, until such time as the accumulator 301 finishes its accumulation of the 511R samples descriptive of one cycle of the "NEW PN511 SEQUENCE". The pedestal-suppression filter 30 of FIG. 6 still further includes a digital multiplier 303 for multiplying the delayed samples from the digital delay line 302 response by a constant factor essentially equal to 515R. The digital multiplier 303 can be constructed from arithmetical logic circuitry or, alternatively, the digital multiplier 303 can be a read-only memory (ROM).

The pedestal-suppression filter 30 of FIG. 6 also includes a digital subtractor 304 receiving as its minuend input signal the samples of the product signal the digital multiplier 303 supplies descriptive of delayed samples from the demodulator and analog-to-digital conversion circuitry 12 multiplied by the constant factor essentially equal to 515R. The digital subtractor 304 receives as its subtrahend input signal the accumulator 301 output signal having a value essentially 515R times as large as the direct component in each of the 511R samples in the one cycle of the "NEW PN511 SEQUENCE". The digital subtractor 304 responds to these minuend and subtrahend input signals with a difference output signal that corresponds to delayed samples from the demodulator and analog-to-digital conversion circuitry 12 multiplied by the constant factor essentially equal to 515R, but has substantially no accompanying direct pedestal term. A connection 305 shifts the binary point of this difference output signal several binary places to the left to divide it by a factor close to 511R. The less significant bits of each resulting quotient sample can be discarded before applying it to the match filter 31 or 32 as input signal thereto. Such round-off procedure reduces the bitswidth requirement of digital delay stages used in constructing the match filter 31 or 32.

Owing to signal transitions being affected by the limited bandwidth of the receiver, the level of the component of the accumulator 301 response caused by the PN511 sequence having 256 ones but only 255 zeroes may be slightly less than 4R times as large as the direct component in each of the 511R samples in the one cycle of the "NEW PN511 SEQUENCE". This can be compensated for by slightly changing the constant by which the digital multiplier 303 multiplies the samples of the digital delay line 302 response.

If the match filter 31 be used, it is a finite-impulse-response digital filter with kernel coefficients corresponding to the FIG. 3 PN511 sequence. That is, presuming the sample rate to be a multiple of the baud rate, the kernel coefficient is +1 for samples occurring during a one in the FIG. 3 PN511 sequence and is −1 samples occurring during for a zero in the FIG. 3 PN511 sequence. If instead the match filter 32 be used, it is an FIR digital filter with kernel coefficients corresponding to the FIG. 4 PN511 sequence. That is, presuming the sample rate to be a multiple of the baud rate, the kernel coefficient is +1 for samples occurring during a one in the FIG. 4 PN511 sequence and is −1 for samples occurring during a zero in the FIG. 4 PN511 sequence. In either case, the match filter can be constructed from a chain of clocked digital adders and subtractors, presuming the sample rate to be a multiple of the baud rate. If the sample rate is not a multiple of the baud rate, the match filter will require digital multipliers in its construction. The weighting coefficients are defined by the PN511 sequence subjected to lowpass filtering with Nyquist slope roll-off at 5.38 MHz.

This alternative construction can also be employed even if the sample rate is a multiple of the baud rate and may provide slightly more accurate ghost-location information because intersymbol interference is suppressed. However, the strong autocorrelation of a PN sequence tends to forestall problems from intersymbol interference.

FIG. 6 also shows in greater detail the construction of the comb filter 33 for suppressing repeats of ghosts located by the match filter 31 or 32. A gate 331 at the input port of the comb filter 33 selectively applies the match filter response to a digital subtractor 332 as its minuend input signal and to a digital delay line 333 as its input signal. The gate 331 selectively applies the match filter response to the subtractor 332 and the digital delay line 333 in a time interval in each data field near its conclusion, which interval extends from the time associated with the earliest correctable pre-ghost to the time associated with the latest correctable post-ghost. At all other times the gate 331 applies a zero-valued signal to the subtractor 332 as its minuend input signal and to the digital delay line 333 as its input signal. The delay line 333 delays by 511 symbol epochs the match filter response selected by the gate 331 and applies its delayed response to the digital subtractor 332 as its subtrahend input signal. The difference output signal from the subtractor 332 is supplied to the computer 20 as the response from the comb filter 33.

Figure 7:
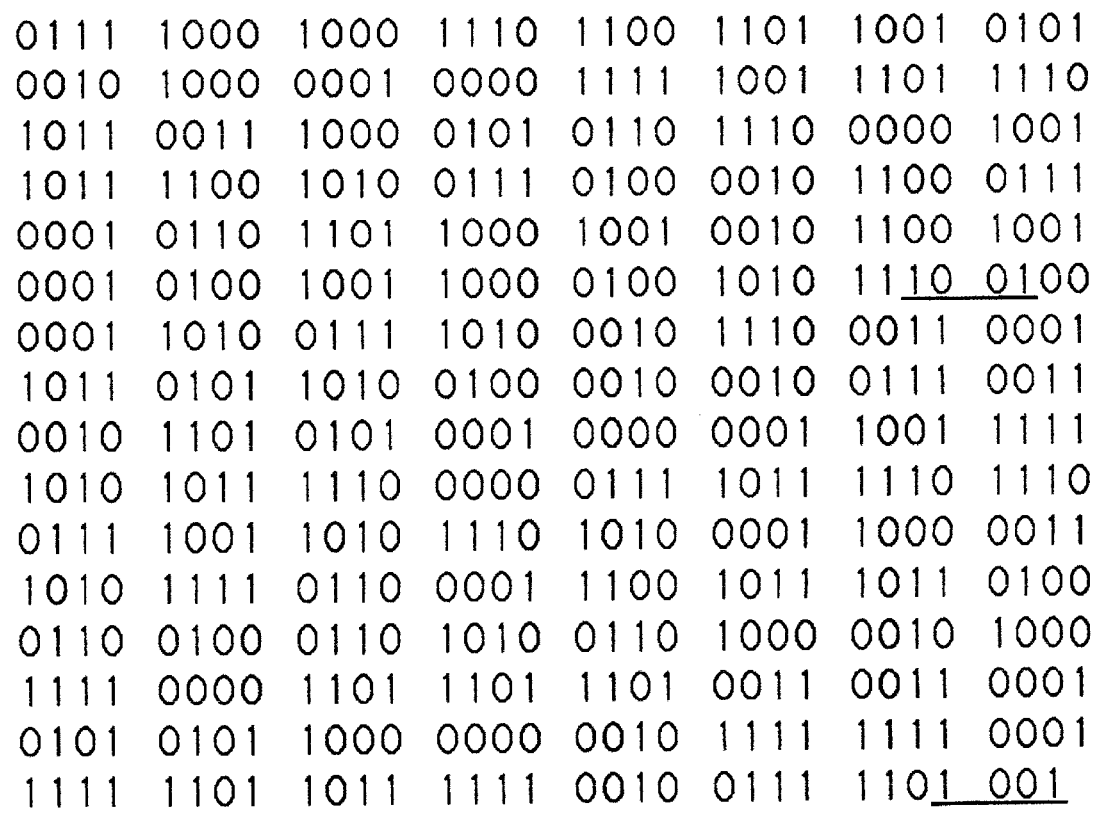

FIG. 7 shows another "NEW PN511 SEQUENCE" that can be employed in the data segments graphed in FIGS. 2B, 2C, 2D, 2F, 2G and 2H. The FIG. 7 "NEW PN511 SEQUENCE" is generated by inverting the ones-and-zeroes logic of the PN511 sequence prescribed by A/53, as well as reversing the order of that sequence, then rotating the result until the prescribed requirements for a "NEW PN511 SEQUENCE" in regard to DSS locations therein are satisfied. The FIG. 7 "NEW PN511 SEQUENCE" has 256 zeroes and 255 ones therein, rather than having 255 zeroes and 256 ones therein as the FIG. 3 "NEW PN511 SEQUENCE" and the FIG. 4 "NEW PN511 SEQUENCE" do.

Figure 8:
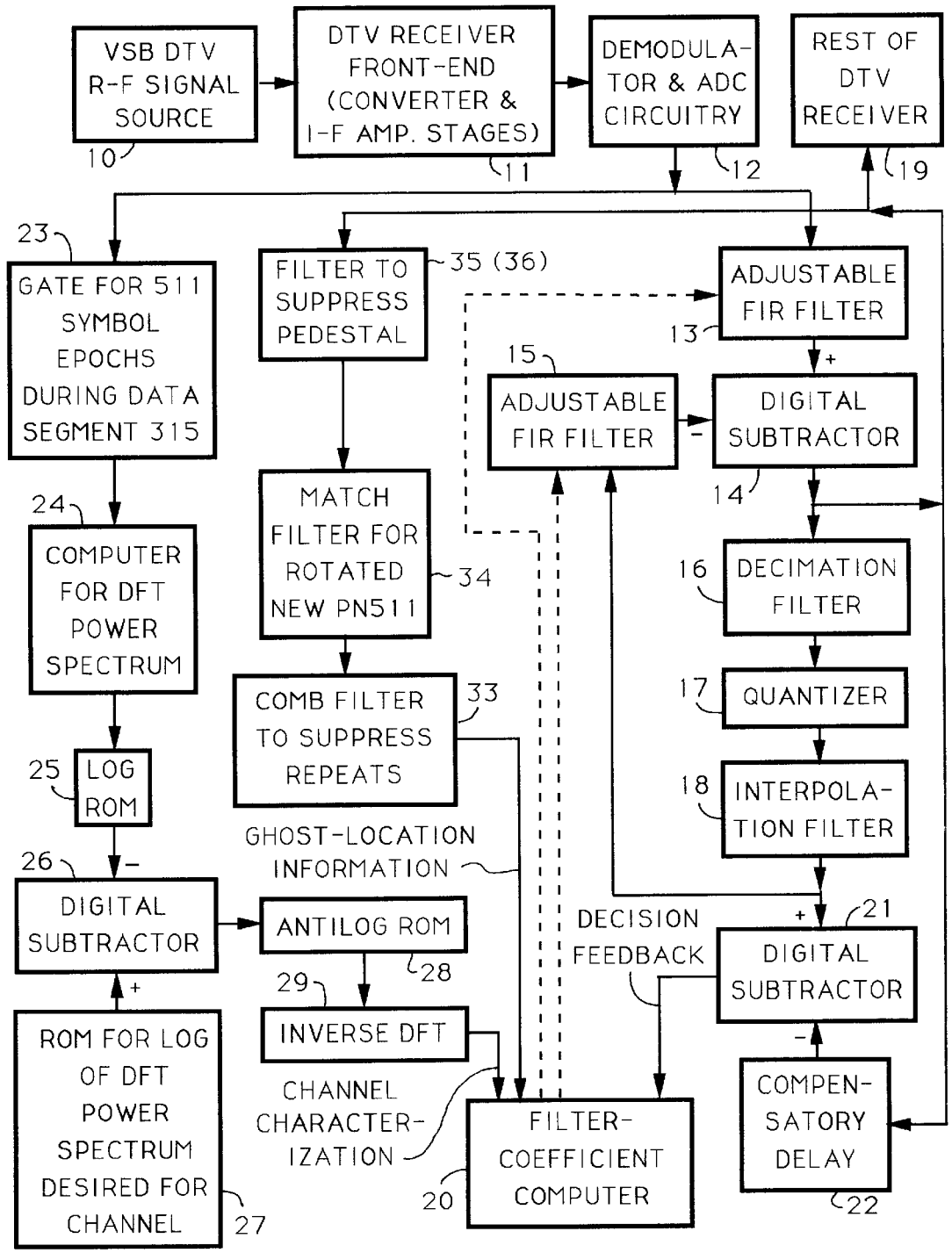
FIG. 8 is a schematic diagram of a receiver for broadcast digital television signals, which receiver in accordance with a further aspect of the invention includes structure capable of utilizing the ghost cancellation reference signal of FIGS. 2A, 2B, 2C, 2D, 2E, 2F, 2G and 2H when that GCR signal employs a PN511 sequence per FIG. 7.

FIG. 8 shows modified versions of the FIG. 5 DTV receiver which are adapted for processing the FIG. 7 "NEW PN511 SEQUENCE". In both of the modified versions of the FIG. 5 DTV receiver shown in FIG. 8 a match filter 34 for a rotated version of the FIG. 7 "NEW PN511 SEQUENCE" replaces the match filter 31 for the FIG. 3 "NEW PN511 SEQUENCE" or the match filter 32 for the FIG. 4 "NEW PN511 SEQUENCE" that FIG. 5 shows. The match filter 34 is an FIR digital filter with kernel coefficients corresponding to the FIG. 7 PN511 sequence. The match filter 34 supplies its response as input signal to the comb filter 33, which filter 33 suppresses repeats of ghosts located by the match filter 34. FIG. 8 shows the pedestal-suppression filter 30 of FIG. 5 being replaced either by a pedestal-suppression filter 35, which is shown in detail in FIG. 9, or by a pedestal-suppression filter 36, which is shown in detail in FIG. 10.

Figure 9:
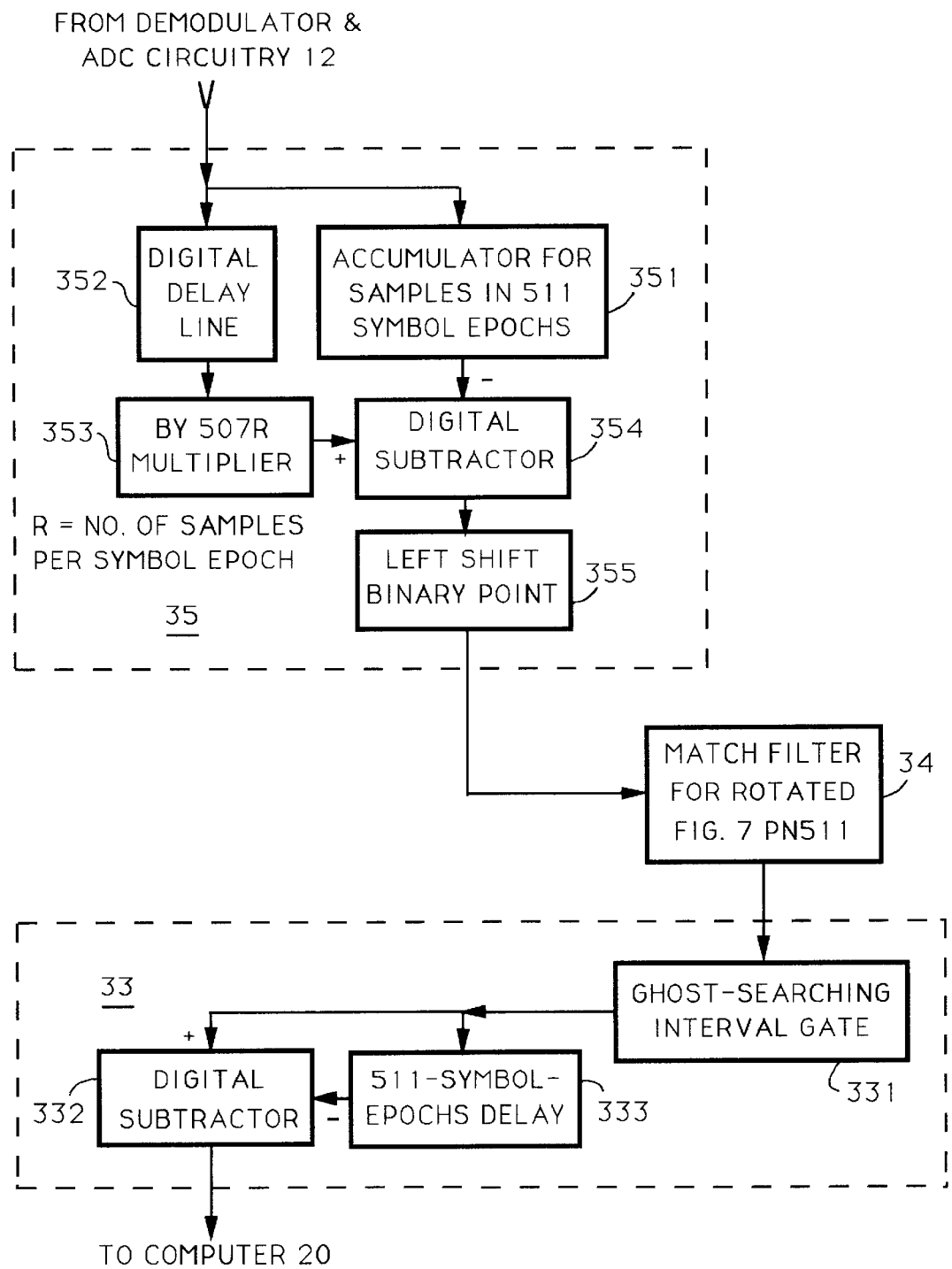
FIGS. 9 and 10 are detailed schematic diagram of alternative circuitry for the portion of the FIG. 8 receiver for broadcast digital television signals used to determine the positions of ghosts respective to the principal signal.

The pedestal-suppression filter 35 shown in detail in FIG. 9 is similar to the replaced pedestal-suppression filter 30 in that there is an accumulator 351 for accumulating 511R samples descriptive of one cycle of the "NEW PN511 SEQUENCE", as supplied from the demodulator and analog-to-digital conversion circuitry 12. The accumulator 351, like the accumulator 301, will have as a component of its response a term 511R times as large as the direct component in each of the 511R samples in the one cycle of the FIG. 7 "NEW PN511 SEQUENCE", which direct component arises from synchronous detection of pilot carrier that ideally has a +1.25 normalized modulation level. However, another component of the accumulator 351 response is a term arising from the fact that the "NEW PN511 SEQUENCE" per FIG. 7 has one more symbol with −5 normalized modulation level than with +5 normalized modulation level. This other component of the accumulator 351 response will approach a level 4R times as large as the direct component in each of the 511R samples in the one cycle of the FIG. 7 "NEW PN511 SEQUENCE", but will be of polarity opposite from the polarity of the direct component that arises from synchronous detection of pilot carrier. So the total accumulator 351 response at the end of the accumulation period spanning one cycle of the "NEW PN511 SEQUENCE" of FIG. 7 will approach a value only 507R times as large as the direct component in each of the 511R samples in the one cycle of that sequence.

The pedestal-suppression filter 35 of FIG. 9 further includes a digital delay line 352 for delaying samples in the $314^{th}$ and $315^{th}$ data segments of each data field, as supplied from the demodulator and analog-to-digital conversion circuitry 12, until such time as the accumulator 351 finishes its accumulation of the 511R samples descriptive of one cycle of the FIG. 7 "NEW PN511 SEQUENCE". The pedestal-suppression filter 35 of FIG. 6 still further includes a digital multiplier 353 for multiplying the delayed samples from the digital delay line 352 response by a constant factor essentially equal to 507R. Advantageously, the constant factor essentially equal to 507R has fewer bit places than the constant factor essentially equal to 515R used as multiplier by the digital multiplier 303 in the FIG. 6 pedestal-suppression filter 30.

The pedestal-suppression filter 35 of FIG. 9 also includes a digital subtractor 354 receiving as its minuend input signal the samples of the product signal the digital multiplier 353 supplies descriptive of delayed samples from the demodulator and analog-to-digital conversion circuitry 12 multiplied by the constant factor essentially equal to 507R. The digital subtractor 354 receives as its subtrahend input signal the accumulator 351 output signal having a value essentially 507R times as large as the direct component in each of the 511R samples in the one cycle of the FIG. 7 "NEW PN511 SEQUENCE". The digital subtractor 354 responds to these minuend and subtrahend input signals with a difference output signal that corresponds to delayed samples from the demodulator and analog-to-digital conversion circuitry 12 multiplied by the constant factor 507R, but has substantially no accompanying direct pedestal term.

A connection 355 shifts the binary point of this difference output signal several binary places to the left to divide it by a factor close to 511R. The less significant bits of the resulting quotient are discarded in a round-off procedure to reduce the bitswidth requirement of digital delay stages used in constructing the match filter 34 receiving the rounded-off quotient as an input signal.

Owing to signal transitions being affected by the limited bandwidth of the receiver, the level of the component of the accumulator 351 response caused by the PN511 sequence having 256 zeroes but only 255 ones may be slightly less than 4R times as large as the direct component in each of the 511R samples in the one cycle of the "NEW PN511 SEQUENCE". This can be compensated for by slightly changing the constant by which the digital multiplier 353 multiplies the samples of the digital delay line 352 response.

Figure 10:
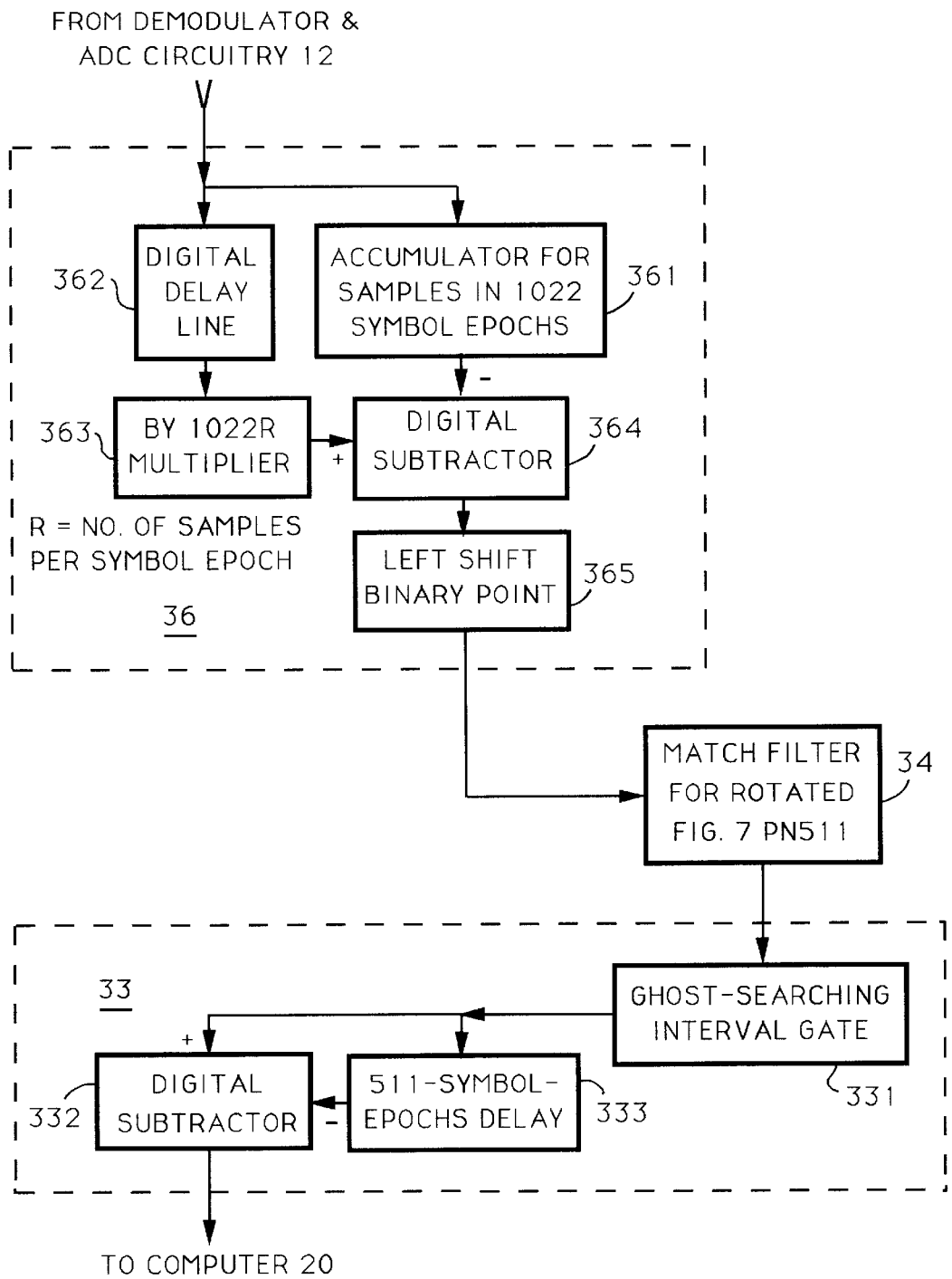

FIG. 10 shows a pedestal-suppression filter 36 that differs from the pedestal-suppression filters 30 and 35 in the way for correcting the error term arising from the numbers of ones and zeroes differing in a PN sequence. The pedestal-suppression filter 36 includes an accumulator 361 for initially accumulating 511R samples descriptive of the final cycle of the FIG. 7 "NEW PN511 SEQUENCE" in the last data segment of each data field, as supplied from the demodulator and analog-to-digital conversion circuitry 12. The accumulator 361 continues accumulating the ensuing 511R samples of the initial data segment of the next data field descriptive of the A/53 PN511 sequence (the "OLD PN511 SEQUENCE"). The accumulator 361 response is 1022R times as large as the direct component in each sample of either PN511 sequence, which direct component arises from synchronous detection of pilot carrier that ideally has a +1.25 normalized modulation level. The component of the accumulator 361 response tending to arise because the "NEW PN511 SEQUENCE" per FIG. 7 has one more symbol with −5 normalized modulation level than with +5 normalized modulation level is counteracted by a component of the accumulator 361 response tending to arise because the "OLD PN511 SEQUENCE" per A/53 has one more symbol with +5 normalized modulation level than with −5 normalized modulation level. So the total accumulator 361 response at the end of the accumulation period spanning one cycle of the FIG. 7 "NEW PN511 SEQUENCE" and one cycle of the "OLD PN511 SEQUENCE" will approach a value 1022R times as large as the direct component in each sample of these sequences.

The pedestal-suppression filter 36 of FIG. 10 further includes a digital delay line 362 for delaying samples in the 315th data segment of each data field and the initial data segment of the succeeding data field, as supplied from the demodulator and analog-to-digital conversion circuitry 12, until such time as the accumulator 361 finishes its accumulation of the 1022R samples descriptive of one cycle of the FIG. 7 "NEW PN511 SEQUENCE" followed by one cycle of the "OLD PN511 SEQUENCE". The pedestal-suppression filter 36 of FIG. 10 still further includes a digital multiplier 363 for multiplying the delayed samples from the digital delay line 362 response by a constant factor 1022R. Multiplication can be done using read-only memory. Multiplication by arithmetic logic is also possible. Subtraction of the bit-extended multiplicand with binary point shifted two bit places right from the bit-extended multiplicand with binary point shifted ten bit places right is a good way to multiply by 1022.

The pedestal-suppression filter 36 of FIG. 10 also includes a digital subtractor 364 receiving as its minuend input signal the samples of the product signal the digital multiplier 363 supplies descriptive of delayed samples from the demodulator and analog-to-digital conversion circuitry 12 multiplied by the constant factor 1022R. The digital subtractor 364 receives as its subtrahend input signal the accumulator 361 output signal having a value 1022R times as large as the direct component in each sample of the PN511 sequences. The digital subtractor 364 responds to these minuend and subtrahend input signals with a difference output signal that corresponds to delayed samples from the demodulator and analog-to-digital conversion circuitry 12 multiplied by the constant factor 1022R, but has substantially no accompanying direct pedestal term.

A connection 365 shifts the binary point of this difference output signal several binary places to the left to divide the signal by a factor close to 1022R. The less significant bits of the resulting quotient are discarded in a round-off procedure to reduce the bitswidth requirement of the digital delay stages used in constructing the match filter 34 receiving the rounded-off quotient as an input signal.

FIGS. 11A, 11B, 11C, 11D, 11E, 11F, 11G and 11H depict the symbol contents of respective data segments in a broadcast digital television signal transmitted together with a second general type of ghost cancellation reference signal. This second general type of GCR signal features a repetitive PN511 sequence that begins late in each data field, such as the last data segment of the data field as shown in FIGS. 11C and 11G. This second general type of GCR signal characteristically concludes in the initial data segment of the succeeding data field as shown in FIGS. 11D and 11H. Accordingly, this second general type of GCR signal requires that the "OLD PN511 SEQUENCE" per A/53 be dispensed with entirely or that this PN511 sequence be rotated so that it ends with a DSS sequence. The latter alternative is preferred and permits a DTV receiver essentially the same as shown in FIGS. 5 and 6. Of course, the match filter 31, 32 or 34 is replaced by a match filter suitable for the rotated "OLD PN511 SEQUENCE", and there is some adjustment of delays and gating intervals as one skilled in the art will understand to be merely a matter of ordinary design.

Figure 12:
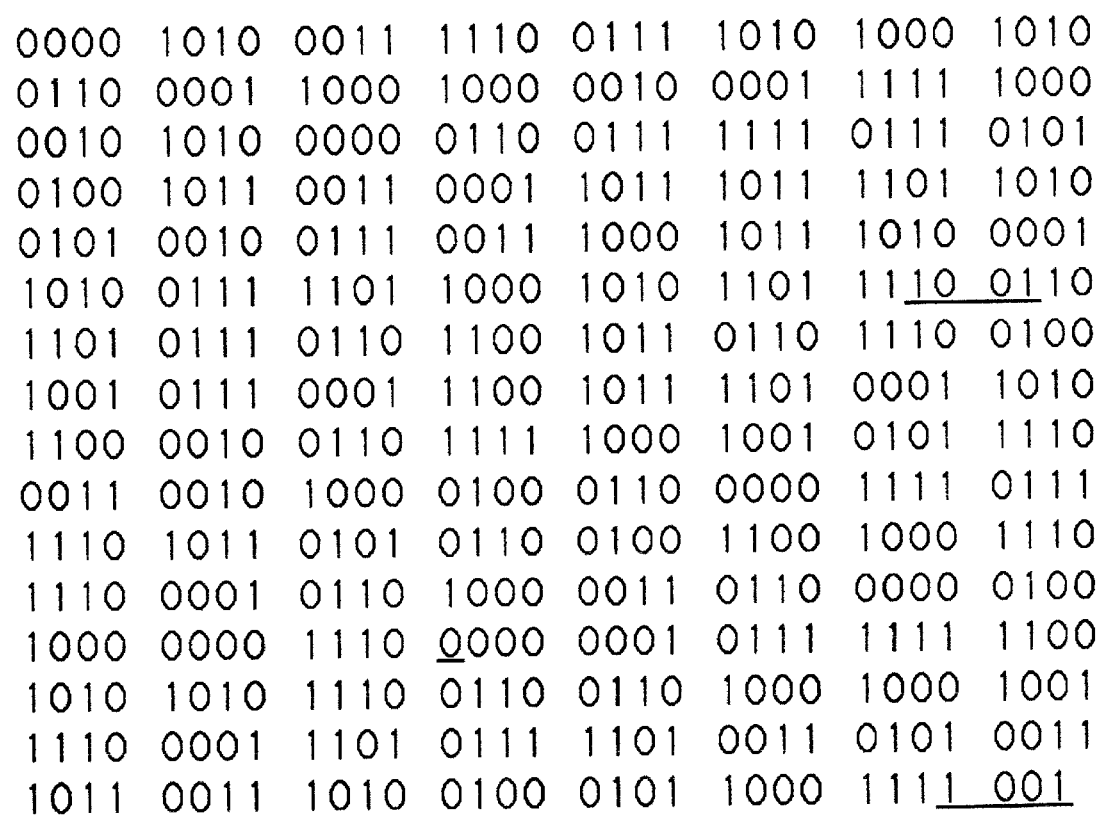
Figure 13:
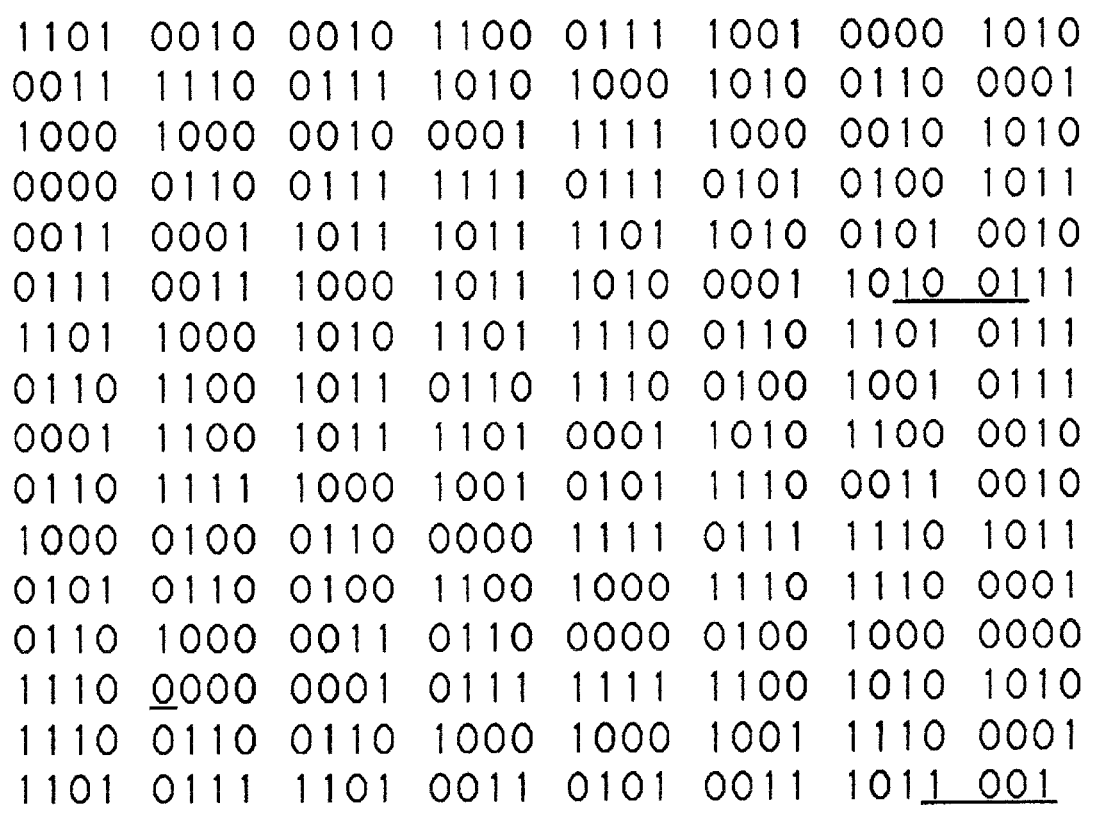

FIGS. 12 and 13 show the two rotations of the "OLD PN511 SEQUENCE" that conclude with a DSS sequence and that further include a DSS sequence in the $187^{th}$, $188^{th}$, $189^{th}$ and $190^{th}$ symbol positions. The inventor's opinion is that the rotated "OLD PN511 SEQUENCE" of FIG. 13 is the better choice to use in the second general type of ghost cancellation reference signal shown in FIGS. 11A through 11H. This preference is based on the following two observations. The number of symbol positions the "OLD PN511 SEQUENCE" is rotated is smaller in FIG. 13 than in FIG. 12. Furthermore, the first two symbols of the PN63 sequence per A/53 continue the rotated "OLD PN511 SEQUENCE" of FIG. 13, but initial symbols of that PN63 sequence do not continue the rotated "OLD PN511 SEQUENCE" of FIG. 12, The repetitive PN511 sequence should include the first four symbol epochs of the $315^{th}$ data segment of each data field, so that the ghosting of the DSS sequence in these symbol epochs fits into the cyclic pattern of PN511 sequence ghosting. Starting the repetitive PN511 sequence at the beginning of the 315$^{th}$ data segment of each data field provides capability for suppressing ghosts with more than seventy microseconds delay. So, when 60/177,080 was filed, the inventor believed it was unnecessary to begin the repetitive PN511 sequence in the latter part of the 314$^{th}$ data segment of each data field.

The inventor's observation in 60/177,080 is that information-free intervals of too extended length can cause trouble with the automatic gain control of amplifier stages in the DTV receiver front-end 11. In order that pre-ghosts preceding the principal signal by as many as four microseconds and post-ghosts succeeding the principal signal by as many as forty microseconds be guaranteed not to interfere with ghost location procedures using the PN511 match filter, the repetitive PN511 sequence should be preceded by an information-free interval of at least 474 symbol epochs. So, 60/177,080 suggests that information be transmitted in the first 354 symbol epochs immediately following the DSS sequence in each 314$^{th}$ data segment, as FIGS. 11B and 11F show. Then, the repetitive PN511 sequence can be started at the beginning of the 315$^{th}$ data segment, as FIGS. 11C and 11G show.

Alternatively, 60/177,080 indicates, the duration of the information-free interval in the 314$^{th}$ data segment of each data field can be reduced to 473 symbol epochs or so by beginning the repetitive PN511 sequence in the latter part of that 314$^{th}$ data segment. However, 60/177,080 indicates, the DTV receiver may need a differently designed comb filter for suppressing repeats of ghost locations to accommodate the additional cycles in the repetitive PN511 sequence.

Although an information-free interval of at least 474 symbol epochs before the repetitive PN511 sequence was deemed desirable in 60/177,080, that application indicates the inventor felt there was a fair possibility that the omission of the partial "NEW PN511 SEQUENCE" per FIG. 12 or 13 in the final data segment of each data field would be found acceptable, allowing the use of data fields that have only 314 data segments. At the time 60/177,080 was filed, the inventor's belief was that pre-ghosts could be pretty much eliminated by careful receiver design. Then, 60/177,080 indicates, an information-free interval of only 431 symbol epochs would be needed before the repetitive PN511 sequence to guarantee that the PN511 match filter could be used to locate post-ghosts of the repetitive PN511 sequence delayed as much as forty microseconds, without possibility of the ghosts of other signals affecting the match filter response. The data and DSS sequence immediately before an information-free interval of only 321 symbol epochs duration will have ghosts after the information-free interval which 60/177,080 indicates generally are considerably lower in energy than the principal signal. The selectivity of the PN511 match filter against other sequences of 511 symbols will further reduce the PN511 match filter response to these long-delayed ghosts of the data and DSS sequence, which data and DSS sequence occurred immediately before the information-free interval of only 321 symbol epochs duration. There may be sufficient reduction of the PN511 match filter response to these long-delayed ghosts that they are lost in the rounding-off procedures used in the digital processing, 60/177,080 indicates.

Since 60/177,080 was filed, more results of testing DTV reception in the field have become publicly known. In mid-year 2000, pre-ghosts advanced as much as thirty microseconds and post-ghosts delayed as much as sixty microseconds were reported as having substantial energy at some reception sites. Multipath conditions at reception sites in the inner city are now known to cause pre-ghosts with substantial energy even in DTV receivers designed with adequate shielding of their components from stray radiation. In light of this information, it is preferred that the signals shown in FIGS. 11B and 11F be modified to avoid transmitting information in the first 354 symbol epochs immediately following the DSS sequence in each 314$^{th}$ data segment. The first 354 symbol epochs immediately following the DSS sequence in each 314$^{th}$ data segment is too short an interval for transmitting information in the standard 828-symbol transport packet format, anyway.

Figure 14:
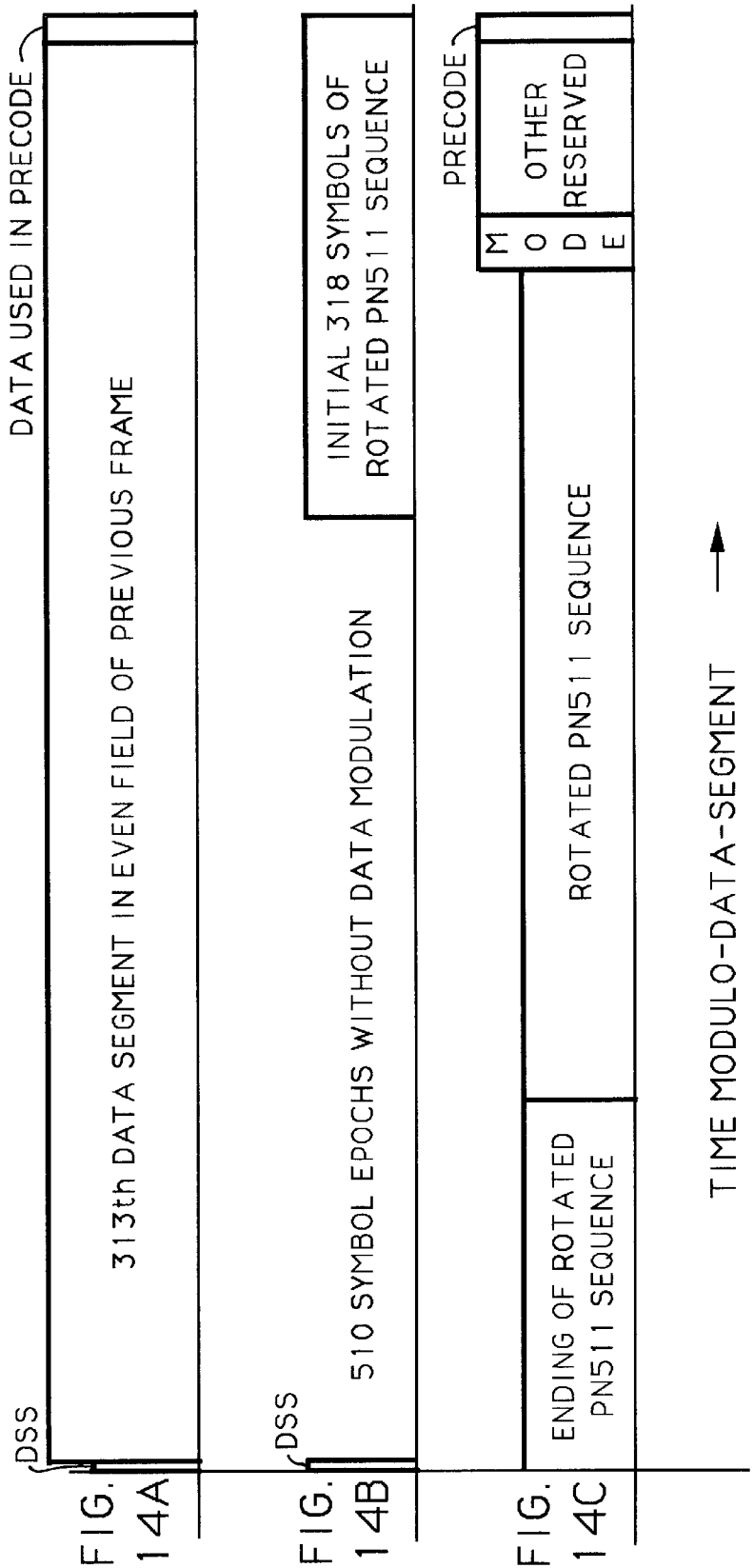
FIGS. 14A, 14B and 14C depict the symbol contents of respective data segments in a broadcast digital television signal transmitted together with a third type of ghost cancellation reference signal in accordance with still another aspect of the invention.

FIGS. 14A, 14B and 14C show how a repetitive PN511 sequence can be inserted into a 314-data-segment data field if the triple PN63 sequence is omitted from the initial data segment of each data field. In this third general type of GCR signal, the 24-symbol mode code sequence is preceded by a final cycle of rotated "OLD PN511 SEQUENCE", instead of being preceded by the omitted triple PN63 sequence. The immediately preceding cycle of this rotated "OLD PN511 SEQUENCE" bridging the 314$^{th}$ data segment in one data field, as shown in FIG. 14B, and the initial data segment of the next data field, as shown in FIG. 14C, will have 832−(511+24+92+12)=193 symbols in that initial data segment. The initial 318 symbols of the bridging PN511 sequence conclude the 314$^{th}$ data segment in each data field, as shown in FIG. 14B. The bridging PN511 sequence is preceded in the 314$^{th}$ data segment by an information-free interval extending over 828−318=510 symbol epochs and having 47.4 microseconds duration. Pre-ghosts preceding the principal signal by as many as four microseconds and post-ghosts succeeding the principal signal by as many as 43.4 microseconds can be guaranteed not to interfere with ghost location procedures using the PN511 match filter. The modification of A/53 illustrated by FIGS. 14A, 14B and 14C does not provide for the unique identification of odd and even data frames. If such identification is necessary, it can be included in the "other reserved" portion of the initial data segment of each data field. This "other reserved" portion precedes the 12-symbol precode and has a 92-symbol-epoch duration. So, by way of example, a PN63 sequence having one sense of polarity can be included in the reserved portion of each odd data field, and a PN63 sequence having the opposite sense of polarity can be included in the reserved portion of each even data field.

Figure 15:
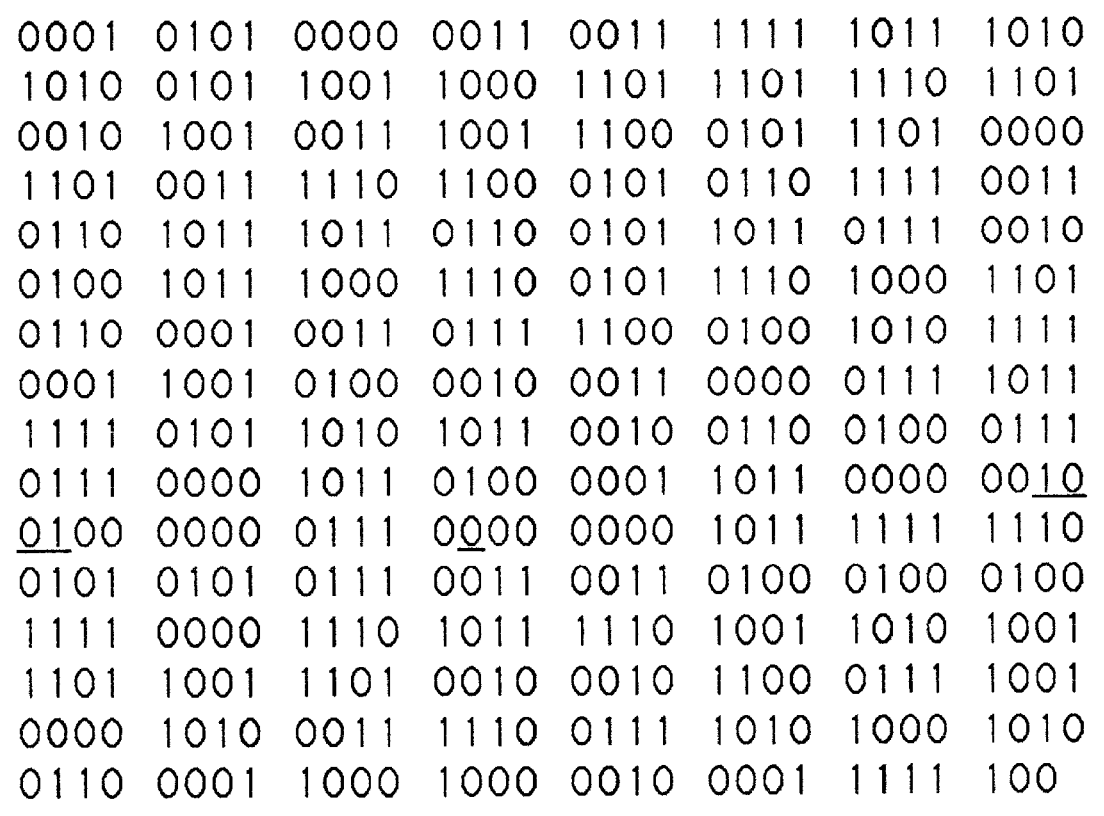

FIG. 15 shows the preferred rotation of the A/53 "OLD PN511 SEQUENCE" to be used as the "ROTATED PN511 SEQUENCE" in the third general type of GCR signal shown in FIGS. 14B and 14C. The "OLD PN511 SEQUENCE" appears eleven symbols later than prescribed by A/53. DTV receivers already in the field that use match filter response to the "OLD PN511 SEQUENCE" for identifying the initial data segment of each data field, but do not rely on counting symbol epochs from the peak response for receiver operations will probably continue to be operable with the GCR signal per FIGS. 14B, 14C, and 15.

Repetitive PN511 sequences exist which can subsume three consecutive data segment synchronization (DSS) sequences and which do not contain any other pairs of such 4-symbol sequences on 832-symbol-epoch spacing. Indeed, a few of these repetitive PN511 sequences can subsume four consecutive DSS sequences. A simple computer program for analyzing PN511 sequences from published tables is any easy way to find PN511 sequences that can form such repetitive PN511 sequences. Repetitive PN511 sequences that subsume three consecutive DSS sequences are particularly of interest when modification of A/53 is contemplated which does not seek to preserve backward compatibility with DTV receivers already in the field. FIGS. 16A, 16B, 16C, 16D, 16E, 16F, 16G, 16H, 16I and 16J are referred to collectively as FIG. 16. These figures illustrate a fourth type of ghost cancellation reference signal used in a modification of A/53 that cannot be received by DTV receivers already in the field.

FIGS. 16A, 16B, 16C and 16D depict the symbol contents of the $313^{th}$, $314^{th}$, $315^{th}$ and $316^{th}$ data segments of the even data field of a data frame in the broadcast digital television signal; and FIG. 16E graphs the symbol contents of the initial data segment of the odd data field of the succeeding data frame. FIGS. 16F, 16G, 16H and 16I depict the symbol contents of the $313^{th}$, $314^{th}$, $315^{th}$ and $316^{th}$ data segments of that odd data field of that succeeding data frame; and FIG. 16J graphs the symbol contents of the initial data segment of the even data field of that succeeding data frame. The second through $313^{th}$ data segments of the data fields do not differ from those in the A/53 DTV signal. The data frames are modified from A/53 and are of the general type shown in FIG. 1. More specifically, the data frames in this broadcast DTV signal are modified to include additional $314^{th}$, $315^{th}$ and $316^{th}$ data segments in each data field.

In a fourth type of ghost cancellation reference signal, the $314^{th}$ data segment in each data field of the DTV signal as transmitted includes an information-free interval of 828 symbol epochs duration after the 4-symbol DSS sequence at its beginning, as shown in FIGS. 16B and 16G. As initially recovered in the DTV receiver, this information-free interval is apt to be contaminated by post-ghosts of data in the $313^{th}$ data segment and of the 4-symbol DSS sequence beginning the $314^{th}$ data segment. The information-free interval in the $314^{th}$ data segment is followed by a 2397-symbol-long period of baud-rate repetitive PN511 sequence. As shown in FIGS. 16C and 16H, the $315^{th}$ data segment in each data field contains the first 832 symbols of the repetitive PN511 sequence. The 4-symbol DSS sequence at the beginning of the $315^{th}$ data segment in each data field is incorporated into the repetitive PN511 sequence as the first four symbols thereof. As shown in FIGS. 16D and 16I, the $316^{th}$ data segment in each data field contains the $832^{nd}$ through $1664^{th}$ symbols of the repetitive PN511 sequence. The 4-symbol DSS sequence at the beginning of the $316^{th}$ data segment in each data field is incorporated into the repetitive PN511 sequence as the $833^{rd}$ through $1664^{th}$ symbols thereof. As shown in FIGS. 16E and 16J, the 4-symbol DSS sequence at the beginning of the initial data segment of the next data field is incorporated into the repetitive PN511 sequence as the $1665^{th}$ through $1668^{th}$ symbols thereof.

The fourth type of ghost cancellation reference signal affects the initial data segments of the data fields considerably, as FIGS. 16E and 16J show. The DSS at the beginning of the initial data segment of each data field is followed by the $1669^{th}$ through $2397^{th}$ symbols of the 2397-symbol-long baud-rate repetitive PN511 sequence. The $1669^{th}$ through $2179^{th}$ symbols of the 2397-symbol-long repetitive PN511 sequence replace the PN511 sequence prescribed in A/53. The $2180^{th}$ through $2368^{th}$ symbols of the 2397-symbol-long repetitive PN511 sequence replace the triple-PN63 sequences prescribed in A/53. The 24-symbol mode code is retained in each initial data segment, but occurs later in the initial data segments than A/53 specifies. FIGS. 16E and 16J show the 24-symbol mode code occurring immediately before the 12-symbol precode that concludes each initial data segment. Each 12-symbol precode repeats the final twelve symbols in the $313^{th}$ data segment of the previous data field, rather than repeating the final twelve symbols in the previous data segment.

FIG. 16E illustrates that the initial data segment of each odd data field includes a prescribed PN63 sequence preceding the re-located 24-symbol mode code. This prescribed PN63 sequence signals that the data field is considered to be odd in a modulo-2 count of data fields.

FIG. 16J illustrates that the initial data segment of each even data field includes a PN63 sequence preceding the re-located 24-symbol mode code, which PN63 sequence is the complement of the prescribed PN63 sequence that signals a data field is considered to be odd in a modulo-2 count of data fields. This complementary PN63 sequence in the initial data segment of each even data field signals that the data field is considered to be even in a modulo-2 count of data fields.

Figure 17:
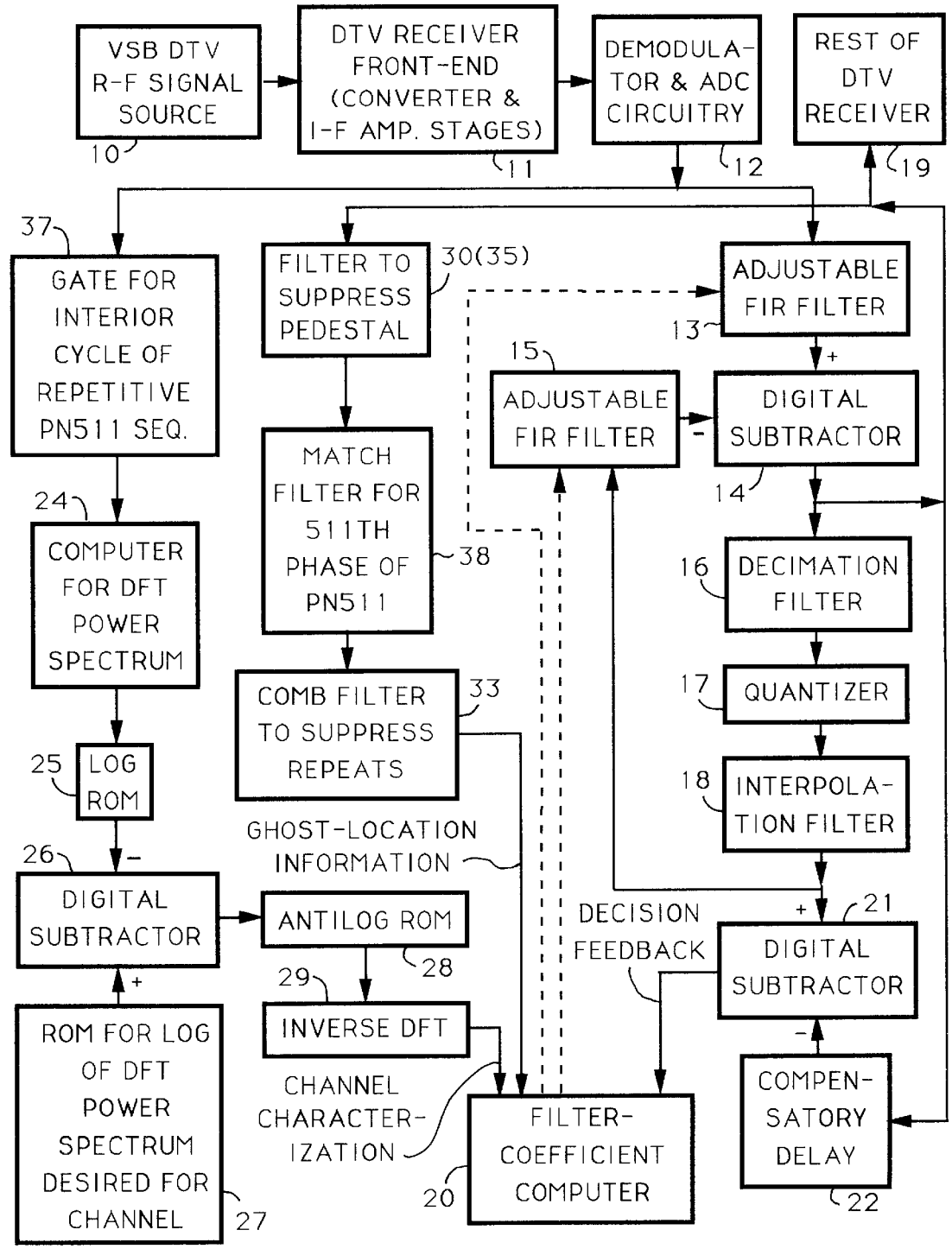
FIG. 17 is a schematic diagram of a receiver for broadcast digital television signals, which receiver in accordance with a farther aspect of the invention includes structure capable of utilizing the ghost cancellation reference signal of FIGS. 16A, 16B, 16C, 16D, 16E, 16F, 16G, 16H, 16I and 16J.

FIG. 17 shows modified versions of the FIG. 5 DTV receiver, which are adapted for processing the FIG. 16 repetitive PN511 sequence. The fourth type of ghost cancellation reference signal imposes different constraints upon the selection of the cycle of PN511 sequence that is gated to the computer 24 for computation of the DFT of its power spectrum. Accordingly, the gate 23 of the FIG. 5 DTV receiver is replaced in the FIG. 17 DTV receiver by a gate 37, which selects to the computer 24 an interior cycle of the repetitive PN511 sequence. This interior cycle is chosen to be somewhere in the range beyond the $511^{th}$ symbol of the repetitive PN511 sequence. So, this interior cycle overlaps portions of the $315^{th}$ and $316^{th}$ data segments of a data field, reposes entirely within the $316^{th}$ data segment, or reposes mostly within the $316^{th}$ data segment with a small overlap into the initial data segment of the next data field. The operation of the computer 24 and the elements 25–29 associated therewith in characterizing the reception channel is similar to the operation of the computer 24 and the elements 25–29 described with regard to the FIG. 5 DTV receiver.

The ghost location circuitry in the FIG. 17 DTV receiver includes either the pedestal suppression filter 30 or the pedestal suppression filter 35 for supplying a response to the digitized baseband signal that filter receives from the demodulator and ADC circuitry 12. If the baud-rate PN511 sequence that is repeated in the fourth type of ghost cancellation reference signal has 256 symbols with +5 normalized modulation level and 255 symbols with −5 normalized modulation level, the FIG. 17 DTV receiver like the FIG. 5 DTV receiver uses the pedestal suppression filter 30 of FIG. 6 in its ghost location circuitry. If instead the baud-rate PN511 sequence that is repeated in the fourth type of ghost cancellation reference signal has 256 symbols with −5 normalized modulation level and 255 symbols with +5 normalized modulation level, the FIG. 17 DTV receiver like the FIG. 8 DTV receiver uses the pedestal suppression filter 35 of FIG. 9 in its ghost location circuitry. The pedestal suppression filter 30 or 35 suppresses, in its response to the digitized baseband signal, the direct component arising from synchronous demodulation of the pilot signal.

This response is supplied to a match filter 38 for a cycle of the repetitive PN511 sequence. The PN511 match filter 38 supplies its response as input signal to the comb filter 33, which filter 33 suppresses repeats of ghosts located by the match filter 38. The response of the comb filter 33 contains a cepstrum characterizing the reception channel. As previously described with reference to FIG. 6 or 9, the comb filter 33 includes a gate 331 for selecting the portion of the baseband DTV signal to be processed by the comb filter 33 for generating this cepstrum.

FIG. 17 specifies the cycle of the repetitive PN511 sequence that the match filter 38 kernel preferably corresponds to is the 511$^{th}$ in successive phasing. That is, preferably the PN511 match filter 38 kernel does not correspond in phasing with the initial cycle of the repetitive PN511 sequence. Preferably, the PN511 match filter 38 kernel corresponds with in phasing with a later cycle of the repetitive PN511 sequence, optimally with a PN511 sequence 510 symbol epochs later. Edge effects in the match filter 38 response, which edge effects are associated with the transition to the repetitive PN511 sequence in the digitized baseband DTV signal supplied to the PN511 match filter 38 as input signal, are suppressed by the gate 331 in the input circuitry of the comb filter 33. The gate 331 will pass 510 symbol epochs of repetitive PN511 response before the match filter 38 response to principal signal appears. Pre-ghosts of this 511$^{th}$ successive phase of PN511 signal that are advanced as much as 510 symbol epochs (i.e., 47.4 microseconds) can be detected exploiting the full autocorrelation properties of the 511$^{th}$ successive phase of PN511 signal that forms the kernel of the match filter 38. Furthermore, post-ghosts of data in the 313$^{th}$ data segment and of the 4-symbol DSS sequence beginning the 314$^{th}$ data segment have to be delayed more than 828+510 symbol epochs (i.e., 124.4 microseconds) to affect this detection procedure at all. The PN511 match filter 38 response to longer delayed post-ghosts of data in the 313$^{th}$ data segment and of the 4-symbol DSS sequence beginning the 314$^{th}$ data segment should be negligible, because they are discriminated against by the match filtering. Furthermore, post-ghosts delayed for so long are apt to have relatively low energy by reason of more signal attenuation in the longer signal paths giving rise to them.

Alternatively, if the match filter 38 kernel corresponds in phasing with a PN511 cycle earlier in the repetitive PN511 sequence, the pre-ghosts of this earlier phase of PN511 signal cannot be advanced as much if they are to be detected after the gate 331 in the input circuitry of the comb filter 33 finishes suppressing edge effects in the match filter 38 response that arise from the transition to the repetitive PN511 sequence in the digitized baseband DTV signal. Also, post-ghosts of data in the 313$^{th}$ data segment and of the 4-symbol DSS sequence beginning the 314$^{th}$ data segment delayed less than 124 microseconds can affect this detection procedure slightly. Interference-free detection of pre-ghosts advanced as much as 30 microseconds, which pre-ghosts reportedly are encountered in the field, is achievable with a PN511 match filter for a cycle of the repetitive PN511 sequence that is only the 323$^{rd}$ in successive phasing. The interference-free detection of pre-ghosts advanced as much as 47.4 microseconds achievable with the PN511 match filter 38 for a cycle of the repetitive PN511 sequence that is the 511$^{th}$ in successive phasing more than meets currently known requirements.

If pre-ghosts advanced as much as 47.4 microseconds have appreciable energy, the pre-ghosts of the PN63 sequence, mode code, and precode at the conclusion of the initial data segment of a data field can extend back as far as to the 223$^{rd}$ symbol epoch of that data segment. I.e., the pre-ghosts overlap the last 510 symbol epochs of the 2397-symbol-long repetitive PN511 sequence. Interference-free detection of post-ghosts of the cycle of the repetitive PN511 sequence that is the 511$^{th}$ in successive phasing extends from the 766$^{th}$ symbol epoch of the 315$^{th}$ data segment to the 799$^{th}$ symbol epoch of the 316$^{th}$ data segment within each data field. This is an 865-symbol-long interval of 80.4 microsecond duration. Interference-free detection of post-ghosts delayed as much as 80.4 microseconds more than meets currently known requirements.

PN511 match filter 38 response to post-ghosts of data extends from the 766$^{th}$ symbol epoch of the 315$^{th}$ data segment of a data field to the 477$^{th}$ symbol epoch of the initial data segment of the next data field, without encountering edge effects caused by the conclusion of the repetitive PN511 sequence. This is an 1375-symbol-long interval of 127.8 microsecond duration. So, detection of post-ghosts delayed between 80.4 and 127.8 microseconds is quite feasible, although there can be slight interference with the detection arising from the PN511 match filter 38 response to the pre-ghosts of the PN63 sequence, mode code, and precode at the conclusion of the initial data segment of the new data field and to pre-ghosts of data in the second data segment of that data field.

The FIG. 17 DTV receiver can be modified to include an auxiliary PN511 match filter the kernel of which corresponds to the initial cycle of the repetitive PN511 sequence. The auxiliary PN511 match filter is used for locating long-delayed post-ghosts. The advantage in its use is that it permits the repetitive PN511 sequence to be shortened by 510 symbols, leaving in the initial data segment of each data field a longer interval for the transmission of other information.

The invention is also embodied in modifications of the fourth general type of ghost cancellation reference signal described above with reference to FIGS. 16A, 16B, 16C, 16D, 16E, 16F, 16G, 16H, 16I and 16J, which modifications differ from the fourth general type of ghost cancellation reference signal with regard to the content of the initial data segments of the data fields. In order to improve backward compatibility with receivers designed to receive A/53 broadcast DTV signals, the initial data segments shown in FIGS. 16E and 16J are replaced by initial data segments per A/53 in certain of these modifications. A DTV receiver similar to that described in the preceding paragraph is suitable for receiving such signal. Even if pre-ghosts advanced as much as 47 microseconds have appreciable energy, post-ghosts delayed as much as 60 microseconds can be detected without any interference from pre-ghosts. Post-ghosts delayed as much as 107 microseconds can be detected without encountering edge effects caused by the conclusion of the repetitive PN511 sequence.

Figure 18:
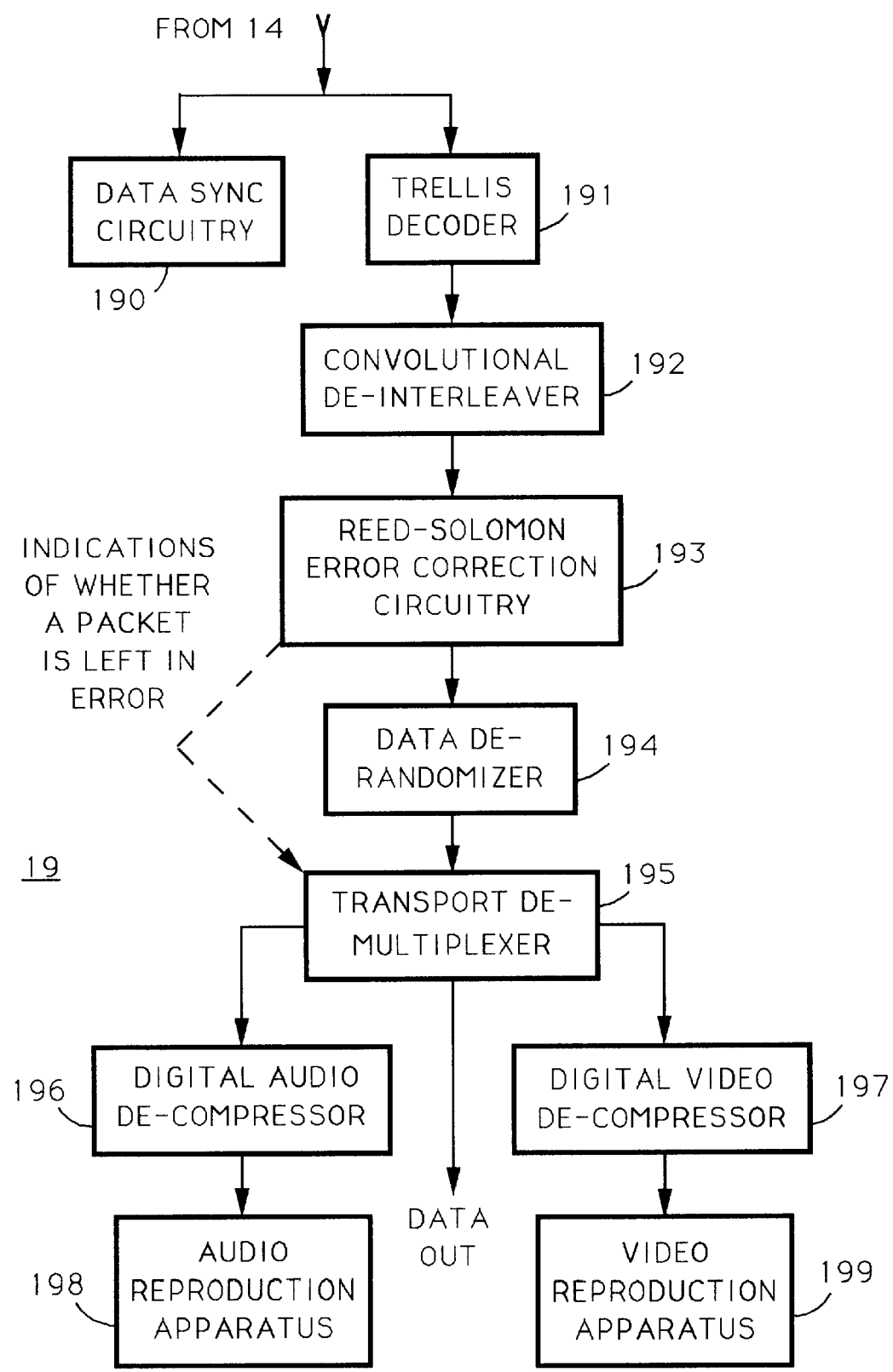
FIG. 18 is a more detailed schematic diagram of later portions of the DTV receiver in any of the FIGS. 5, 8 and 17.

FIG. 18 shows in more detail the rest 19 of the DTV receiver shown in general form in any one of the FIGS. 5, 8 and 17. In that DTV receiver the baseband DTV signal from the adaptive filtering used for channel equalization and ghost suppression—i.e., the difference output signal supplied from the subtractor 14—is applied in FIG. 18 as input signal to data synchronizing circuitry 190 and as input signal to a trellis decoder 191 used as the symbol decoder. In regard to the data synchronizing circuitry 190, detection of data segment synchronization (DSS) sequences and the synchronization of symbol clocking therewith can be done similarly to that described in section 10.2.3.3 of A/54. Data field synchronization of symbol counter circuitry can be done similarly to that described in section 10.2.3.5 of A/54. The trellis decoder 191 is a standard 12-phase Viturbi decoder used in A/53 DTV receivers, as described in section 10.2.3.9 of A/54. Data recovered by the trellis decoder 191 are supplied as input signal to a convolutional de-interleaver 192 of the sort described in section 10.2.3.10 of A/54. Bytes of de-interleaved data from the convolutional de-interleaver 192 are supplied to error-correction circuitry 193 that decodes Reed-Solomon coding to detect errors within data packets. As indicated in section 10.2.3.11 of A/54, the error-correction circuitry 193 can correct up to ten bytes in each data packet, and the error-correction circuitry 193 will signal any packet that could not be corrected and is left in error.

A data de-randomizer 194 is connected for receiving the error-corrected data packets from the error-correction circuitry 193. As described in section 10.2.3.12 of A/54, the data is de-randomized by exclusive-ORing it with a $(2^{16}-1)$-bit pseudo-random noise binary sequence specified in section 4.2.2 of A/53. This maximal-length PN sequence is generated in a 16-stage shift register with prescribed carries, the stages of which register are reset to a prescribed content immediately prior to the initial data segment of each data field.

A data transport de-multiplexer 195 is connected to received the transport stream from the data de-randomizer 194. Responsive to packet identification (PID) headers contained within the different sorts of data packets in the transport stream, the data transport de-multiplexer 195 classifies the packets and sorts them according to their classification. Packets containing compressed digital audio information are routed to a digital-audio de-compressor 196, which in accordance with A/53 is of AC-3 type. Packets containing compressed digital video information are routed to a digital video de-compressor 197, which in accordance with A/53 is of MPEG-2 type.

Audio reproduction apparatus 198 receives plural streams of decompressed digital audio signals from the digital-audio de-compressor 196. The audio reproduction apparatus 198 typically includes digital-to-analog conversion circuitry for converting the decompressed digital audio signals to analog audio electrical signals, audio amplifiers for the analog audio signals, and loudspeakers for converting the analog audio electrical signals to respective analog audio acoustic signals.

Video reproduction apparatus 199 receives plural streams of decompressed digital Y, U, V video signals from the digital-video de-compressor 197 and typically includes digital-to-analog conversion circuitry for converting the decompressed digital video signals to analog Y, U, V video signals. The video reproduction apparatus 199 includes a display device and driver circuitry for the display device, which driver circuitry responds to the analog Y, U, V video signals to control the intensities of picture elements displayed on the viewscreen of the display device. The video reproduction apparatus 199 also receives display synchronization signals from the digital-video de-compressor 197, which display synchronization signals control the placement of the picture elements displayed on the viewscreen of the display device. The display device is a 16:9 aspect ratio kinescope in some embodiments of the video reproduction apparatus 199.

Modifications of the DTV receivers shown in FIGS. 5, 8 and 17 that do not use decision-feedback techniques for updating the weighting coefficients in response to error signals developed from data in the second through $313^{th}$ data segments of each data field are also contemplated by the inventor. In certain of these modifications the weighting coefficients for the equalization and ghost-cancellation filtering are recalculated every data field using the same circuitry used for generating the initial weighting coefficients. In others of these modifications the same circuitry used for generating the initial weighting coefficients for the equalization and ghost-cancellation filtering is used for updating the weighting coefficients.

The problems with automatic gain control (AGC) that can arise when information-free intervals are introduced before training signals are alluded to earlier in this specification. In 60/177,080 it is suggested that these problems with AGC can be avoided by extending the repetitive PN sequences used as training signals, so each begins earlier and fills an interval shown in the drawing as being information free. As a matter of course, 60/177,080 indicates, this approach requires re-design of the comb filtering used to suppress repeats in the ghost location procedure.

Preferably, an interval shown in the drawing as being information-free is filled with a known signal that is not an extension of the repetitive PN511 sequence used as the training signal. Rather the known signal is one "orthogonal" to the repetitive PN511 sequence used as the training signal, so the PN511 match filter used for ghost location is little responsive to this known signal and to its ghosts. This avoids redesigning the comb filtering used to suppress repeats in the ghost location procedure.

The response of the PN511 match filter to the known signal itself can be stored in read-only memory within a DTV receiver and used to compensate against that response. The response of the PN511 match filter to the ghosts of the known signal cannot be predicted before their reception so as to be compensated against, however, which is the reason the known signal should be "orthogonal" to the repetitive PN511 sequence used as the training signal. The detection of ghost location should be kept as interference-free as conveniently possible. A time reversal of the repetitive PN511 sequence used as the training signal offers a good possibility of being a satisfactorily "orthogonal" signal.

Sampling AGC signal(s) shortly before an information-free interval begins and holding the AGC signal(s) at the sampled value(s) until shortly after the information-free interval concludes is another way to avoid AGC problems. Conventionally, the operation of the digital circuitry preceding the transport stream de-multiplexer in the DTV receiver is controlled responsive to counter circuitry counting the average-axis crossings of a master clock oscillator. This counter circuitry typically includes a counter for counting data segments in each data field and a counter for counting symbol epochs in each data segment. It is an easy matter to design AND gate circuitry for responding to the counts from these counters to indicate times that existing AGC signals should be sampled and held, rather than the AGC loop being allowed to continue customary operation.

Introducing information-free intervals before training signals can also affect the decision-feedback techniques used for updating of the weighting coefficients of the adaptive filleting used for channel equalization and ghost suppression-more particularly, the weighting coefficients of the FIR filters 13 and 15. These information-free intervals are not at a modulation level that is standard for data-slicing or for Verturbi decoding in the trellis decoder. So decision-feedback error signals predicated on the estimates of transmitted signals from data-slicing or from Verturbi decoding will be erroneous and will interfere wit the decision-feedback procedure converging to optimal values the weighting coefficients of the adaptive filtering used for channel equalization and ghost suppression. It is strongly preferred that decision-feedback error signals not be predicated on the estimates of transmitted signals front data-slicing or from Vetturbi decoding during the information-free intervals preceding the intervals the training signal is transmitted, during the intervals the training signal is transmitted, and during the intervals in the initial data segments of data fields when known synchronizing information is transmitted. Instead, the estimates of transmitted signals should be based on the a priori knowledge of those transmissions, as stored in read-only memory (ROM) within the DTV receiver. It is an easy matter to design AND gate circuitry to respond to the counts of data segments in each data field and symbol epochs in each data segment for controlling the switch-over in the mode of implementing decision-feedback error signal generation. The response of this AND gate circuitry provides a read-enable signal to the ROM storing a priori knowledge of transmitted symbols, which ROM is addressed by the count of symbol epochs in each data segment (and in some designs also by the count of data segments in each data field). It is preferred that the response of this AND gate circuitry also selectively increase the gain of the decision-feedback loop at times the transmitted symbols are known a priori, taking advantage of the higher confidence factor in decision-feedback error signal at those times.

GCR signals of the types described earlier in this specification can also be used for adapting passband, rather than baseband, equalization and ghost-cancellation filtering. Passband equalization and ghost-cancellation filtering that employs decision feedback methods and that can readily be re-designed to have the initial weighting coefficients for the equalization and ghost-cancellation filtering determined from GCR signals of the types described earlier in this specification is described in U.S. Pat. No. 6,124,898. This patent, titled "DIGITAL TELEVISION RECEIVER WITH EQUALIZATION PERFORMED ON DIGITAL INTERMEDIATE-FREQUENCY SIGNALS", issued Sep. 26, 2000 to C. B. Patel and A. L. R. Limberg.

Provisional application 60/177,080 is incorporated by reference in this application for its description of training signals that use repetitive PN255 sequences. Since it is now known that pre-ghosts in over-the-air DTV reception may be advanced more than the duration of one cycle of baud-rate PN255 sequence, such training signals are now considered non-essential subject matter.

One skilled in the art and acquainted with the GCR signals disclosed in this specification and its drawing will be enabled to design variants of these GCR signals that use the same principles to advantage in substantially like manner and spirit. This should be borne in mind when assessing the scope of the inventions described herein.

What is claimed is:

1. A method of structuring each of a succession of consecutive, non-overlapping data fields for digital television broadcasting to at least one receiver having adaptive equalization and echo suppression filtering therein, said method comprising steps of:

dividing each said data field into a prescribed number of successive data segments, each containing a prescribed number of plural-modulation-level symbols; and beginning each data segment with a respective data segment synchronizing sequence of common type, which data segment synchronizing sequence is composed entirely of symbols of first and second modulation levels as used in said plural-modulation-level symbols; said method being improved to comprise a further step of:

including, within each of periodically occurring groups of at least two consecutive data segments in said succession of consecutive data fields, a prescribed number of consecutive cycles at least two of a repetitive pseudo-random noise sequence composed entirely of symbols each of one of said first and said second modulation levels, said repetitive pseudo-random noise sequence extending into each of the data segments of that one of said groups of at least two consecutive data segments in which said repetitive pseudo-random noise sequence is included, and said consecutive cycles of said repetitive pseudo-random noise sequence subsuming therewithin each said data segment synchronizing sequence of said common type between the consecutive data segments in that said one of said groups of at least two consecutive data segments in which said repetitive pseudo-random noise sequence is included.

2. A receiver for digital television signals broadcast in accordance with the method of claim 1, said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

DFT computer apparatus for computing the discrete Fourier transform of the power spectrum of a signal from a set of successive digital samples thereof that are of prescribed number and prescribed sampling rate;

gating circuitry for selecting to said DFT computer apparatus a respective set of successive digital samples selected from each occurrence of said repetitive pseudo-random noise sequence in the digitized baseband broadcast digital television signal recovered by said demodulator and analog-to-digital conversion circuitry, each said set of successive digital samples as so selected being of said prescribed number and said prescribed sampling rate;

circuitry for generating a discrete Fourier transform characterizing the actual transmission channel by determining the quotient of each term of said discrete Fourier transform that said DFT computer apparatus computes, in response to said digital samples selected by said gating circuitry, and the corresponding term of a discrete Fourier transform indicative of the response of an ideal transmission channel to the selected portion of said repetitive pseudo-random noise sequence;

inverse-discrete-Fourier-transform circuitry for computing the inverse discrete Fourier transform of said discrete Fourier transform characterizing said actual transmission channel; and adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to said inverse discrete Fourier transform.

3. A receiver for digital television signals broadcast in accordance with the method of claim 1, said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-todigital conversion circuitry connected for receiving said amplified intermediate-frequency signal from said front-end circuitry;

a pedestal-suppression filter connected to said demodulator and analog-to-digital conversion circuitry for receiving said digitized baseband broadcast digital television signal as its input signal and for supplying as its output signal a response to said digitized baseband broadcast digital television signal in which a substantially constant pedestal value attributable to synchronous detection of pilot carrier wave is suppressed;

match filter apparatus connected to receive as its input signal the output signal of said pedestal-suppression filter and to supply a match filter response indicative of the strength as a function of time of the correlation of the output signal of said pedestal-suppression filter with a cycle of said repetitive pseudo-random noise sequence of particular phase, said match filter response containing a repetitive cepstrum in response to each said repetitive pseudo-random noise sequence in the output signal of said pedestal-suppression filter;

circuitry for reproducing one cepstrum from each said repeating cepstrum, thereby to supply a respective separated cepstrum; and adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to at least one of said separated cepstrums.

4. The method of claim 1, further including steps of:

forward-error-correction coding data to generate forward-error-correction coded data;

convolutionally interleaving said forward-error-correction coded data to generate convolutionally interleaved forward-error-correction coded data;

trellis coding said convolutionally interleaved forward-error-correction coded data to generate trellis-coded data; and apportioning said trellis-coded data among data segments within a prescribed first portion of each said data field exclusive of its initial first data segment and exclusive of a prescribed second portion of each said data field that contains at least a portion of a respective one of said periodically occurring groups of at least two consecutive data segments.

5. A receiver for digital television signals broadcast in accordance with the method of claim 4, said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

DFT computer apparatus for computing the discrete Fourier transform of the power spectrum of a signal from a set of successive digital samples thereof that are of prescribed number and prescribed sampling rate;

gating circuitry for selecting to said DFT computer apparatus a respective set of successive digital samples selected from each occurrence of said repetitive pseudo-random noise sequence in the digitized baseband broadcast digital television signal recovered by said demodulator and analog-to-digital conversion circuitry, each said set of successive digital samples as so selected being of said prescribed number and said prescribed sampling rate;

circuitry for generating a discrete Fourier transform characterizing the actual transmission channel by determining the quotient of each term of said discrete Fourier transform that said DFT computer apparatus computes, in response to said digital samples selected by said gating circuitry, and the corresponding term of a discrete Fourier transform indicative of the response of an ideal transmission channel to the selected portion of said repetitive pseudo-random noise sequence;

inverse-discrete-Fourier-transform circuitry for computing the inverse discrete Fourier transform of said discrete Fourier transform characterizing said actual transmission channel;

adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to said inverse discrete Fourier transform;

a symbol decoder connected for receiving said response from adaptive channel-equalization and echo-cancellation filtering and supplying symbol decoder response thereto;

a convolutional de-interleaver connected for de-interleaving said symbol decoder response to generate packets of de-interleaved data;

error-detection-and-correction circuitry connected for detecting any errors in each of said packets of de-interleaved data, said error-detection-and-correction circuitry connected for supplying said packets of de-interleaved data with each one of said packets that had fewer than a prescribed number of errors having been corrected;

a data de-randomizer connected for receiving from said error-detection-and-correction circuitry said packets of de-interleaved data with each one of said packets that had fewer than a prescribed number of errors having been corrected, and for generating a data de-randomizer output signal by exciusive-ORing said de-interleaved data with a prescribed de-randomizing signal; and a transport-stream de-multiplexer connected for supplying in each of a plurality of output signals therefrom a particular set of identifiable data packets sorted from said data de-randomizer output signal in response to a packet identification signal for each data packet therein not left in error by said error-detection-and-correction circuitry.

6. A receiver for digital television signals broadcast in accordance with the method of claim 4, said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

a pedestal-suppression filter connected to said demodulator and analog-to-digital conversion circuitry for receiving said digitized baseband broadcast digital television signal as its input signal and for supplying as its output signal a response to said digitized baseband broadcast digital television signal in which a substantially constant pedestal value attributable to synchronous detection of pilot carrier wave is suppressed;

match filter apparatus connected to receive as its input signal the output signal of said pedestal-suppression filter and to supply a match filter response indicative of the strength as a function of time of the correlation of the output signal of said pedestal-suppression filter with a cycle of said repetitive pseudo-random noise sequence of particular phase, said match filter response containing a repetitive cepstrum in response to each said repetitive pseudo-random noise sequence in the output signal of said pedestal-suppression filter;

circuitry for reproducing one cepstrum from each said repeating cepstrum, thereby to supply a separated cepstrum;

adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to at least one of said separated cepstrums;

a symbol decoder connected for receiving said response from adaptive channel-equalization and echo-cancellation filtering and supplying a symbol decoder response thereto;

a convolutional de-interleaver connected for de-interleaving said symbol decoder response to generate packets of de-interleaved data;

error-detection-and-correction circuitry connected for detecting any errors in each of said packets of de-interleaved data, said error-detection-and-correction circuitry connected for supplying said packets of de-interleaved data with each one of said packets that had fewer than a prescribed number of errors having been corrected;

a data de-randomizer connected for receiving from said error-detection-and-correction circuitry said packets of de-interleaved data with each one of said packets that had fewer than a prescribed number of errors having been corrected, and for generating a data de-randomizer output signal by exclusive-ORing said de-interleaved data with a prescribed de-randomizing signal; and a transport-stream de-multiplexer connected for supplying in each of a plurality of output signals therefrom a particular set of identifiable data packets sorted from said data de-randomizer output signal in response to a packet identification signal for each data packet therein not left in error by said error-detection-and-correction circuitry.

7. The receiver of claim 3, wherein said particular phase is one corresponding with a cycle of said repetitive pseudo-random noise sequence delayed from the beginning of said repetitive pseudo-random noise sequence.

8. A receiver for digital television signals broadcast in accordance with the method of claim 4, said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

a pedestal-suppression filter connected to said demodulator and analog-to-digital conversion circuitry for receiving said digitized baseband broadcast digital television signal as its input signal and for supplying as its output signal a response to said digitized baseband broadcast digital television signal in which a substantially constant pedestal value attributable to synchronous detection of pilot carrier wave is suppressed;

match filter apparatus connected to receive as its input signal the output signal of said pedestal-suppression filter and to supply a match filter response indicative of the strength as a function of time of the correlation of the output signal of said pedestal-suppression filter with a cycle of said repetitive pseudo-random noise sequence of particular phase, said match filter response containing a repetitive cepstrum in response to each said repetitive pseudo-random noise sequence in the output signal of said pedestal-suppression filter;

a comb filter connected to receive as its input signal said match filter response and to supply, as a comb filter response to each said repeating cepstrum, a separated cepstrum characterizing the transmission channel to said receiver for digital television signals; and adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to at least one of said separated cepstrums.

9. The receiver of claim 8, wherein said particular phase is one corresponding with a cycle of said repetitive pseudo-random noise sequence delayed from the beginning of said repetitive pseudo-random noise sequence.

10. The improved method of claim 1, wherein each of said consecutive data fields concludes with at least a beginning portion of a respective one of said periodically occurring groups of at least two consecutive data segments.

11. The improved method of claim 10, wherein each of said periodically occurring groups of at least two consecutive data segments concludes with the data segment synchronizing sequence of the next of said consecutive data fields after the one in which that said group of at least two consecutive data segments begins.

12. The improved method of claim 10, wherein the initial data segment each of said consecutive data fields concludes a respective one of said periodically occurring groups of at least two consecutive data segments that begins in an immediately preceding one of said consecutive data fields.

13. The improved method of claim 1, wherein each full cycle of said repetitive pseudo-random noise sequence has a duration no longer than the duration of each said data segment.

14. A receiver for digital television signals, said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

computer apparatus for computing the discrete Fourier transform of the power spectrum of a received signal from a set of successive digital samples thereof that are of prescribed number and prescribed sampling rate, generating from the power spectrum of said signal another discrete Fourier transform characterizing the actual transmission channel, and computing the inverse-Fourier transform of said discrete Fourier transform characterizing said actual transmission channel;

gating circuitry for selecting respective sets of successive digital samples to be supplied to said computer apparatus, each said set of successive digital samples being selected from the digitized baseband broadcast digital television signal recovered by said demodulator and analog-to-digital conversion circuitry, each said set of successive digital samples as so selected being of said prescribed number and said prescribed sampling rate; and adaptive channel-equalization and echo-cancellation filtering connected for responding to said digitized baseband broadcast digital television signal with a response that is adapted by adjustment of the weighting coefficients of said adaptive channel-equalization and echo-cancellation filtering in response to said inverse-Fourier transform.

15. The receiver of claim 14, further comprising:

a symbol decoder for decoding the response of said adaptive channel-equalization and echo-cancellation filtering to recover interleaved data;

a convolutional de-interleaver connected for de-interleaving the interleaved data recovered by said symbol decoder to generate packets of de-interleaved data;

error-detection-and-correction circuitry connected for detecting any errors in each of said packets of de-interleaved data, said error-detection-and-correction circuitry connected for supplying said packets of de-interleaved data with each one of said packets that had fewer than a prescribed number of errors having been corrected;

a data de-randomizer connected for receiving from said error-detection-and-correction circuitry said packets of de-interleaved data with each one of said packets that had fewer than a prescribed number of errors having been corrected, and for generating a data de-randomizer output signal by exciusive-ORing said de-interleaved data with a prescribed de-randomizing signal; and a transport-stream dc-multiplexer connected for supplying in each of a plurality of output signals therefrom a particular set of identifiable data packets sorted from said data de-randomizer output signal in response to a packet identification signal for each data packet therein not left in error by said error-detection-and-correction circuitry.

16. The receiver of claim 14 adapted for receiving digital television signals composed of successive data segments each beginning with a respective data segment synchronizing sequence, wherein said gating circuitry for selecting respective sets of successive digital samples is of a type for selecting each said set of successive digital samples so as to include at least one said data segment synchronizing sequence.

17. The receiver of claim 14; wherein said gating circuitry for selecting respective sets of successive digital samples to be supplied to said computer apparatus is connected for supplying said computer apparatus with sequences of known symbols selected from the digitized baseband broadcast digital television signal recovered by said demodulator and analog-to-digital conversion, which supplied sequences of known symbols are susceptible to accompanying multipath distortion; and wherein said computer apparatus is arranged to extend each sequence of known symbols supplied thereto with additional samples for generating an extended sequence with an integral power of two number of samples, which extended sequence provides the basis on which the power spectrum of each sequence of known symbols as received with any accompanying multipath distortion is subsequently computed.

18. The receiver of claim 17 wherein the additional samples to extend each sequence of known symbols are all null samples.

19. The receiver of claim 14, wherein said computer apparatus is of a type for generating said discrete Fourier transform characterizing the actual transmission channel by dividing the discrete Fourier transform of the power spectrum of said received signal, term by term, by the discrete Fourier transform of the power spectrum of a Nyquist filter response to the signal as the receiver knows it to have been transmitted.

20. The receiver of claim 14 adapted for receiving digital television signals composed of successive data segments each beginning with a respective data segment synchronizing sequence, wherein said gating circuitry for selecting respective sets of successive digital samples is of a type for selecting each said set of successive digital samples from more than one of said successive data segments, thereby to include at least one said data segment synchronizing sequence.

21. A method of structuring each of a succession of consecutive, non-overlapping data fields in a digital television signal for broadcasting to at least one receiver having adaptive equalization and echo suppression filtering therein, said method comprising steps of:

dividing each said data field into a prescribed number of successive data segments, each containing a prescribed number of plural-modulation-level symbols;

forward-error-correction coding data to generate forward-error-correction coded data;

convolutionally interleaving said forward-error-correction coded data to generate convolutionally interleaved forward-error-correction coded data;

processing said convolutionally interleaved forward-error-correction coded data for inclusion in consecutive data segments within a prescribed first portion of each said data field beginning with a second one of its data segments immediately succeeding the initial first one of its data segments, said prescribed first portion of each said data field ending before the conclusion of that said data field;

beginning each data segment within said prescribed first portion of each said data field with a respective data segment synchronizing sequence of common type, which data segment synchronizing sequence consists of symbols of first and second modulation levels as used in said plural-modulation-level symbols;

beginning, within a concluding second portion of each said data field immediately succeeding said prescribed first portion thereof, a prescribed training signal that continues longer than a data segment and extends into the next of said succession of consecutive data fields, that is composed entirely of said plural-modulation-level symbols arranged in prescribed order, and that exhibits well-defined auto-correlation properties for essentially each and every 511-symbol-epoch portion thereof; and concluding said prescribed training signal within a first data segment of the next of said succession of consecutive data fields, the portion of said prescribed training signal within the first data segment of each said data field including at least one 511-symbol cycle of a particular maximal-length pseudo-random noise sequence that is composed entirely of symbols of first and second modulation levels as used in said plural-modulation-level symbols.

22. The method of claim 21, wherein said prescribed training signal includes more than one cycle of said particular maximal-length pseudo-random noise sequence, the resultant repetitive pseudo-random noise sequence beginning in the concluding second portion of each data field and concluding within the first data segment of the next of said succession of consecutive data fields.

23. A receiver for digital television signals broadcast in accordance with the method of claim 21, said receiver comprising:

front-end circuitry for supplying an amplified intermediate-frequency signal responsive to a radio-frequency broadcast digital television signal selected for reception;

demodulator and analog-to-digital conversion circuitry for recovering a digitized baseband broadcast digital television signal from said amplified intermediate-frequency signal, said demodulator and analog-to-digital conversion circuitry connected for receiving said amplified intermediate-frequency signal from said front-end circuitry;

adaptive channel-equalization and echo-cancellation filtering connected for responding to said digitized baseband broadcast digital television signal with a response that is adapted by adjustment of weighting coefficients of said adaptive channel-equalization and echo-cancellation filtering;

gating circuitry for selecting a respective set of successive digital samples selected from each occurrence of said training signal in the digitized baseband broadcast digital television signal recovered by said demodulator and analog-to-digital conversion circuitry, each said set of successive digital samples as so selected being of said prescribed number and said prescribed sampling rate; and computational apparatus for adapting the weighting coefficients of said adaptive channel-equalization and echo-cancellation filtering responsive to at least one of said sets of successive digital samples selected by said gating circuitry.

* * * * *